(12) United States Patent
Ventrella et al.

(10) Patent No.: US 6,545,682 B1
(45) Date of Patent: Apr. 8, 2003

(54) METHOD AND APPARATUS FOR CREATING AND CUSTOMIZING AVATARS USING GENETIC PARADIGM

(75) Inventors: Jeffrey J. Ventrella, San Francisco, CA (US); William D. Harvey, Palo Alto, CA (US); Benjamin M. Werther, Palo Alto, CA (US)

(73) Assignee: There, Inc., Menlo Park, CA (US)

( * ) Notice: Subject to any disclaimer, the term of this patent is extended or adjusted under 35 U.S.C. 154(b) by 0 days.

(21) Appl. No.: 09/577,269

(22) Filed: May 24, 2000

(51) Int. Cl.$^7$ ............................................... G06T 15/00

(52) U.S. Cl. ..................................................... 345/473

(58) Field of Search ................................. 345/473, 475, 345/474, 419, 420

(56) References Cited

U.S. PATENT DOCUMENTS

| | | | |
|---|---|---|---|
| 5,261,041 A | 11/1993 | Susman ....................... | 395/152 |
| 5,267,154 A | 11/1993 | Takeuchi et al. ............ | 364/419 |
| 5,347,306 A | 9/1994 | Nitta ............................ | 348/15 |
| 5,483,630 A | 1/1996 | Unuma et al. ............... | 395/152 |
| 5,546,518 A | 8/1996 | Blossom et al. ............ | 395/152 |
| 5,577,185 A | 11/1996 | Tunnell et al. ............... | 395/152 |
| 6,331,861 B1 * | 12/2001 | Gever et al. ................. | 345/473 |
| 6,359,622 B1 * | 3/2002 | Hayes-Roth ................ | 345/474 |

OTHER PUBLICATIONS

Lauder, Jeff, "To Deceive is To Enchant: Programmable Animation", Game Developer, May 2000, pp. 15–16, and 20.

* cited by examiner

Primary Examiner—Phu K. Nguyen
(74) Attorney, Agent, or Firm—Blakely, Sokoloff, Taylor & Zafman LLP; Jordan M. Becker

(57) ABSTRACT

A method and apparatus for creating an avatar are described. A number of user-modifiable genes are maintained in a local processing system, each of which represents a different user-perceivable attribute of the avatar. An encoded representation of the genes is then transmitted to a remote processing system over a network. The genes represent non-geometry parameters, which are used in both the local processing system and the remote processing system to generate geometry for rendering the avatar. One or more of the genes may represent a biomechanical, behavioral, and/or biometric attribute of the avatar. One or more of the genes may be adjusted by a user to allow the user to customize the avatar, which may be performed using a graphical user interface designed for avatar customization. Adjusting one or more of the genes may generate a variation of a previously-generated avatar and may be used to control blending between two or more 3-D models or animation scripts. An avatar may be generated by using a pseudorandom number generator to generate one or more of the genes. One or more of the genes may be associated with a personality trait of the avatar, such as alertness, shiftiness, curiosity, or tendency to daydream.

26 Claims, 16 Drawing Sheets

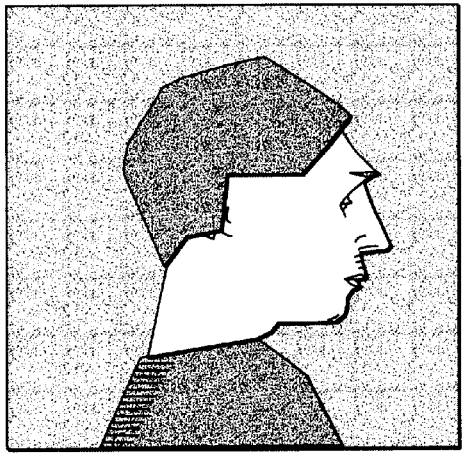
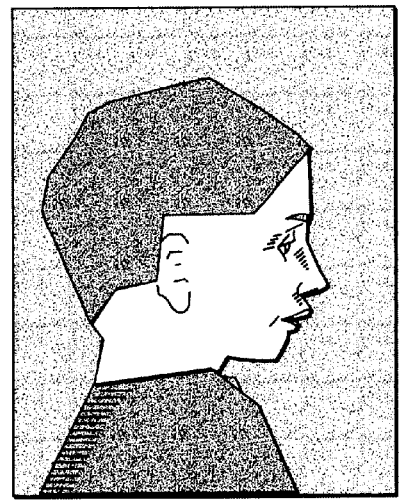
Fig. 3A
Fig. 3B
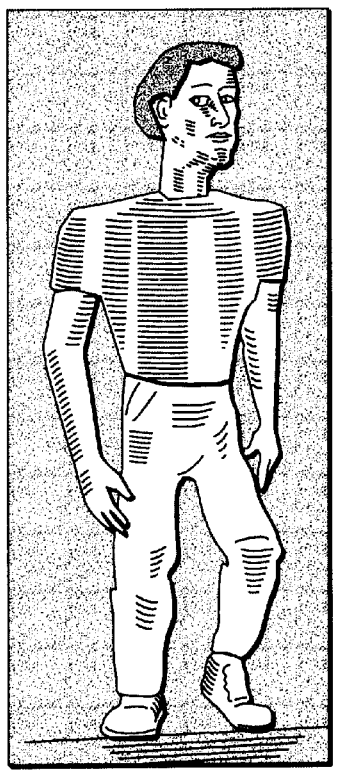
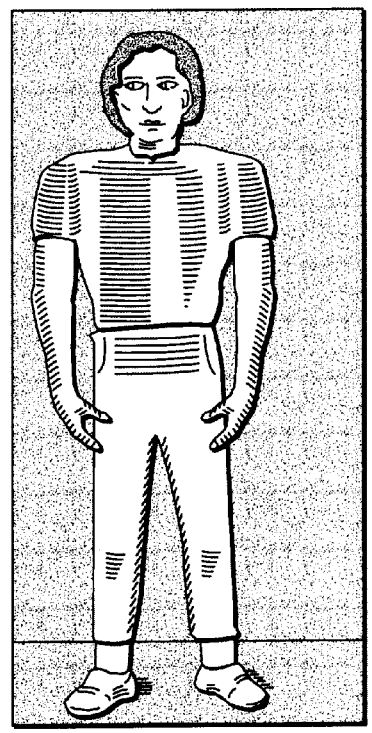
Fig. 4A
Fig. 4B

METHOD AND APPARATUS FOR CREATING AND CUSTOMIZING AVATARS USING GENETIC PARADIGM

FIELD OF THE INVENTION

The present invention pertains to computer-based simulation of real-world environments. More particularly, the present invention relates to techniques for creating and customizing avatars for use a virtual environment.

BACKGROUND OF THE INVENTION

Computer games and arcade games often feature animated, user-controlled characters which represent human users and which appear human or humanoid. These characters are referred to as "avatars". Currently, there is growing interest in creating an on-line community in which people can interact with each other in a virtual world, through avatars. Ideally, the virtual world will provide sufficient "richness" so that the avatars can interact with each other and their virtual environment in much the same way people interact in the real world. The availability of the Internet makes such a virtual world potentially accessible to millions of users. Such a virtual world may impact many areas of everyday life, including communications, entertainment, commerce, and education, to name just a few.

The usefulness and success of an avatar-based game or virtual community depends largely on the sophistication and realism of the avatars. Users will not be inclined to use or participate in such applications if their avatars are either unrealistic or too-limited in capability. Hence, some potentially desirable characteristics of avatars are: 1) that they are identifiably humanoid; 2) that they are attractive to the user; 3) that they can have many variations and possess individual uniqueness; and 4) that they can interact realistically with other objects in their virtual environments.

Today, attractiveness and visual realism of avatars are sometimes achieved through three-dimensional (3-D) modeling packages that exploit artistic talent in character modeling, to model each unique avatar. This approach becomes expensive, however, if the goal is to generate many thousands of avatars, where each avatar is unique. Existing tools allow users to define limited variations in avatars through single-parameter or multiple-choice selection interfaces. These interfaces tend to allow only simple functions, such as a direct scaling of an avatar or its limbs. Thus, current techniques for creating avatars are poorly suited for creating large numbers of diverse, unique, highly-realistic avatars.

SUMMARY OF INVENTION

The present invention includes a method and apparatus for creating an avatar. The method includes maintaining a number of values, each of which represents a different user-perceivable attribute of the avatar. An encoded representation of the values is then transmitted over a network, to enable display of the avatar by a remote processing system, based on the values.

In various embodiments, the values may represent non-geometry parameters, which are subsequently used to generate geometry parameters for purposes of rendering the avatar. Also, in various embodiments, one or more of the values may represent a biomechanical, behavioral, and/or biometric attribute of the avatar. The values may be adjusted by a user to allow the user to customize the avatar. The customization process may be performed using a graphical user interface designed for avatar customization. Adjusting one or more of the values may generate a variation of a previously-generated avatar and may be used to control blending between two or more 3-D models or animation scripts. An avatar may be generated by using a pseudorandom number generator to generate one or more of the values.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIGS. 3A and 3B show two genetic variations in the crown size of an avatar;

FIGS. 4A and 4B show two genetic variations in the leg length of an avatar;

DETAILED DESCRIPTION

Figure 1:
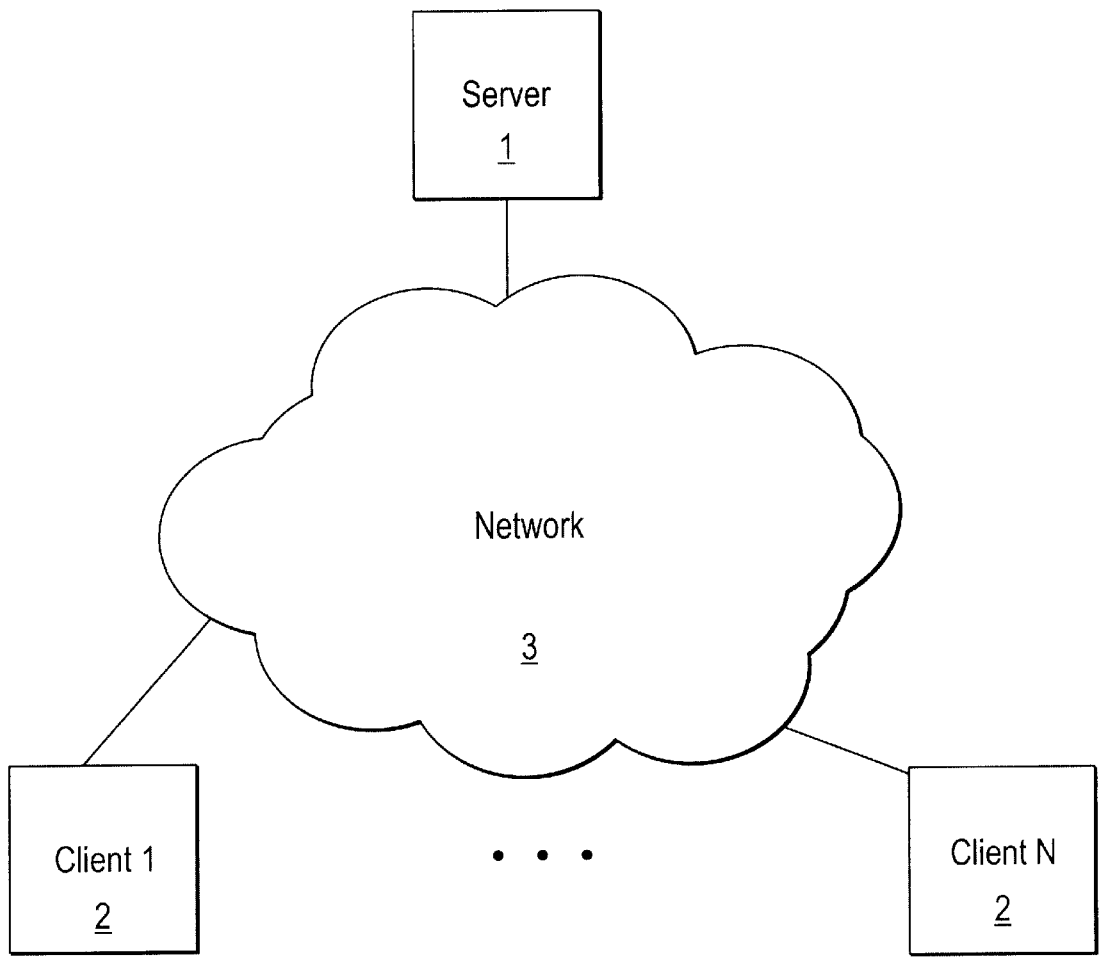
FIG. 1 illustrates a network environment in which the present invention may be implemented.

A method and apparatus for creating an avatar for a virtual environment are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

I. Overview

The techniques described herein facilitate creation of large populations of diverse, unique, highly-realistic avatars. These techniques can be implemented in on-line virtual environments, games, and other applications. As described in greater detail below, a number of user-modifiable values ("genes") are maintained in a computer system, each of which represents a different user-perceivable attribute of an avatar. The "genes" of an avatar are analogous to the genes of a human being, in that they determine characteristics or traits of an avatar that are associated with human being. Certain genes may be associated with biomechanical, behavioral, and/or biometric attributes of an avatar. For example, some genes may determine the shapes and sizes of an avatar's face and body parts, the color of the avatar's eyes, skin, and hair, and the movement characteristics of the avatar. Other genes may determine personality traits of the avatar, such as alertness, shiftiness, curiosity, or tendency to daydream. Such genes influence the behavior of the avatar independently of any direct user input for controlling the avatar. To create avatars, a pseudorandom number generator may be used to select the gene values, in order to generate a large, diverse population of avatars.

The "genotype" (the set of genes) of an avatar may be adjusted by a user through a Graphical User Interface (GUI), which allows the user to customize the avatar. Adjusting one or more of the genes may generate a variation of an existing avatar or of an archetypal avatar. Genetic variations many be "expressed" (manifested) in an avatar algorithmically or by blending between two or more 3-D visual models and/or animation scripts. Expression of genetic variations occur in real-time in response to user inputs. The appearance, motion, and behavior of an avatar, as determined by the genotype, is referred to as the "pheonotype" of the avatar.

During a simulation, an encoded representation of the genotype is transmitted from the computer system (a "client" system) over a network to a server system and/or other remote systems. The genes and the encoded, transmitted genotype are non-geometry data; however, these data are subsequently used by processes within the client system and the remote systems to generate geometry for displaying the avatar (i.e., the visual aspect of the phenotype). As used herein, the term "geometry" refers to the output of a computer-implemented renderer for purposes of displaying an object.

As will be apparent from this description, the techniques described herein may be embodied in software, at least in part. That is, the techniques may be carried out in a computer system (or in multiple computer systems) in response to a microprocessor executing sequences of instructions contained in a storage device. The instructions may be executed from a local memory or mass storage device and/or from one or more other computer systems (collectively referred to as "host computer system").

In the latter case, for example, a host computer system may transmit a sequence of instructions over a network to the ("target") computer system. The target computer system may store the instructions for later execution or execute the instructions as they arrive over the network. In some cases, execution of the instructions may be performed directly by the microprocessor. In other cases, the instructions may not be directly executable by the microprocessor. Under those circumstances, the instructions may be executed by causing the microprocessor to execute an interpreter to interpret the instructions, or by causing the microprocessor to execute instructions which convert the received instructions to instructions that can be directly executed by the microprocessor.

Hardwired circuitry may be used in place of, or in combination with, software instructions to implement the present invention. Thus, the present invention is not limited to any particular combination of hardware and software, nor to any particular source for such software.

Software embodying the present invention may be in the form of, for example, one or more software applications, dynamic link libraries (DLLs), implementations of Application Program Interfaces (APIs), plug-ins, etc., or a combination thereof. Portions of the software may reside in the server and each client participating in a simulation. Other portions may reside in only one platform on the network, such as in a server, or only in particular platforms on the network, as will be apparent to those skilled in the art from this description.

Software embodying the techniques described herein may be written in a conventional programming language, such as C or C++. It may be desirable to employ an object-oriented language, such as C++.

II. Network Environment and Equipment

FIG. 1 illustrates a network environment in which the present invention may be implemented. The environment includes a server 1 which is coupled to a number N of clients 2 via a network 3. Although they are referred to separately, the server 1 and the clients 2 are part of the network 3. Although only two clients 2 are shown, the number N of clients 2 is not restricted to any particular number. The server 1 and each of the clients 2 may be a conventional computer system, such as a personal computer (PC), a workstation, a set-top box, a console game system, or even a hand-held device such as a personal digital assistant (PDA), personal information manager (PIM), or the like. The network 3 may be the Internet, a campus intranet, a wide area network (WAN), a local area network (LAN), or any other type of network or internetwork. Note that the present invention can be applied to networks that use any of a variety of communication techniques, including datagram based networks (e.g., the Internet), connection based (e.g., X.25) networks, virtual circuit based, e.g., Asynchronous Transfer Mode (ATM) networks, etc.

Note also that while FIG. 1 shows a client-server topology, in other embodiments, the techniques described herein may be implemented using other topologies, such as a peer-to-peer topology. In addition, it will be recognized that certain aspects of the techniques described herein are normally implemented within a single machine, or can be implemented in the single machine. Nonetheless, a client-server topology is assumed henceforth, to facilitate description.

During a simulation, each of the clients 2 maintains data representing a set of objects, representing real-world objects. These objects include avatars controlled by, and representing, the human users of the clients 2. Each machine maintains the same objects, however, the states of the objects may be computed at different times on each machine. Hence, in one embodiment, the server 1 maintains the "true" state of each object, i.e., the state which is considered to be the correct state of the object, and the server periodically distributes information regarding the true state of each object (including avatars) to the clients 2, based on inputs received from the clients 2. Note that in certain embodiments, the server 1 may be implemented in the same machine as one or more of the clients 2. However, for purposes of explanation, it is henceforth assumed that the server 1 is implemented in a separate machine on the network. In addition, there may actually be more than one server 1; for example one server may maintain the true state of certain objects, while another server or servers maintain the true state of other objects or perform other server functions.

Figure 2:
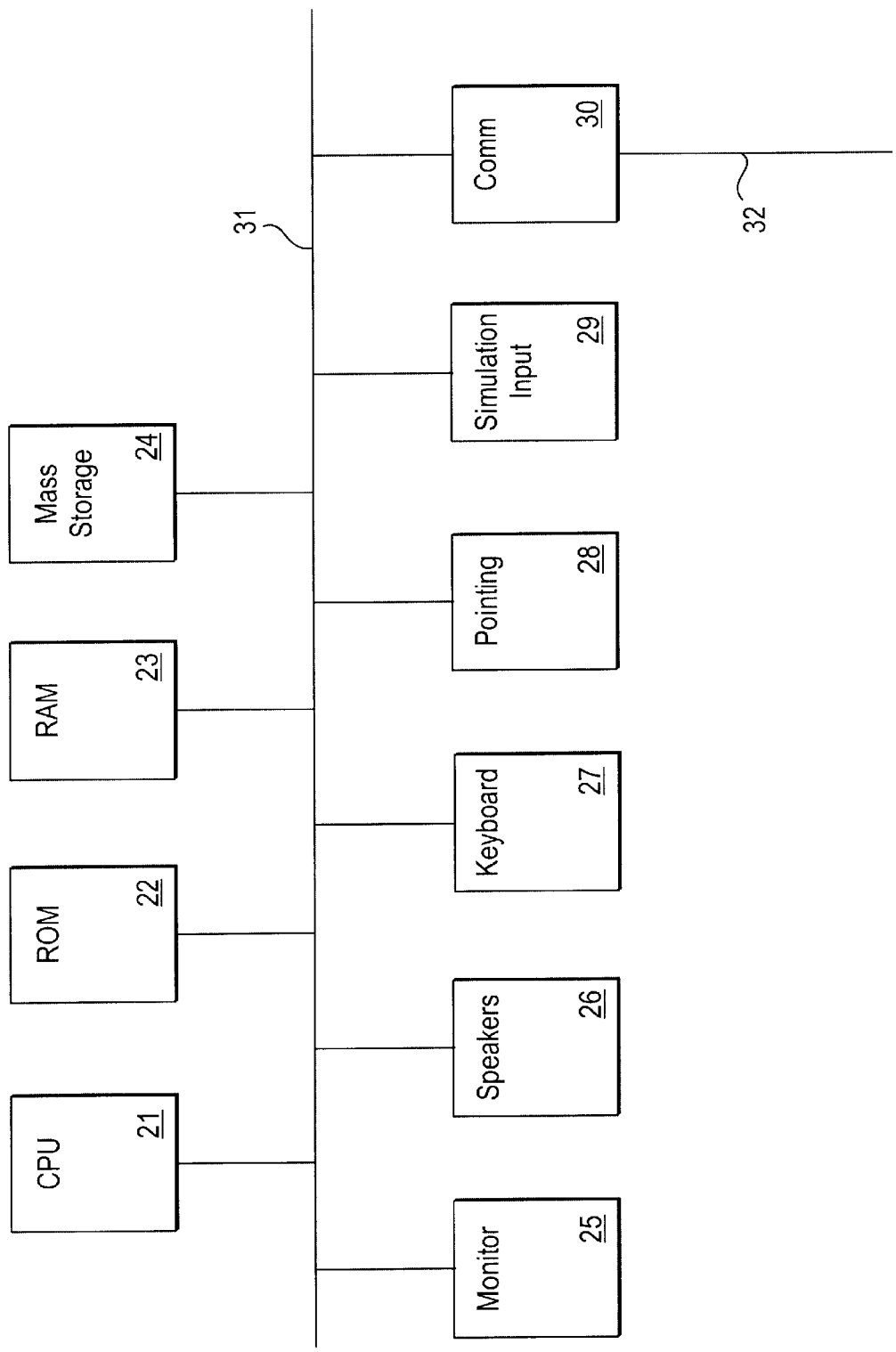
FIG. 2 is a block diagram of a computer system that may be used in the network environment of FIG. 1.

FIG. 2 is a block diagram of a processing system that may represent any of the machines shown in FIG. 1. The illustrated system includes a central processing unit (CPU) 21 (e.g., a microprocessor), read-only memory (ROM) 22, random access memory (RAM) 23, and a mass storage device 24, each connected to a bus system 31. The bus system 31 may include one or more buses connected to each other through various bridges, controllers and/or adapters, such as are well-known in the art. For example, the bus system may include a system bus that is connected through an adapter to one or more expansion buses, such as a Peripheral Component Interconnect (PCI) bus. Also coupled to the bus system 31 are a monitor (display device) 25, audio speakers 26, a keyboard 27, a pointing device 28, a simulation input device 29, and a communication device 30.

Mass storage device 24 may include any suitable device for storing large volumes of data, such as magnetic disk or tape, magneto-optical (MO) storage device, or any of various types of Digital Versatile Disk (DVD) or compact disk (CD) based storage device, flash memory etc. The monitor 25 may be any device suitable for displaying alphanumeric, graphical and/or video data to a user, such as a cathode ray tube (CRT), a liquid crystal display (LCD), or the like, and associated controllers. The pointing device 28 may be any suitable device for enabling a user to position a cursor or pointer on the monitor 25, such as a mouse, trackball, touchpad, joystick, or the like. The simulation input device 29 may be any device which receives user inputs to allow a user to control objects in a simulation, such as a joystick or the like. Note, however, that the keyboard 27 and/or the pointing device 28 may also serve this same purpose, such that the simulation input device 29 may be omitted in certain embodiments. The communication-device 30 may be any device suitable for enabling the computer system to communicate data with another processing system over a network via a communication link 32, such as a conventional telephone modem, a wireless modem, a cable modem, an Integrated Services Digital Network (ISDN) adapter, a Digital Subscriber Line (xDSL) adapter, an Ethernet adapter, or the like.

Note that some of these components may not be present certain embodiments, and certain embodiments may include additional or substitute components not mentioned here. For example, the server 1 may not require components such as the speakers 26 or the simulation input device 29.

III. Genetic Variation of Avatars

The technology described herein offers a flexible and generalized system for defining and modifying features and behaviors of avatars, with reasonable, humanoid form and with great variety. The space of genes allows attractiveness and realism to be easily achieved, with sufficient flexibility to encode genetic variety for uncommon and highly original avatars.

As noted above, the genotype is the set of genes of an avatar, i.e., a concise representation of the appearance, motion, and behavior of an avatar. The number of genes within the genotype does not need to match the number of salient features of an avatar. For example, a genotype of null size, or a genotype which is unavailable, can result in the avatar possessing default, archetypal, or average features. Likewise, in the case of the genotype with more genes than corresponding avatar features, the extra genes may be ignored during phenotypic expression. This flexibility allows for scaling in the phenotypic design. For example, an extra level of variation can be added to the avatar phenotype design at a later time, and unused genes can be assigned to this phenotypic feature and given an average value prior to user customization. In addition, phenotypic features can be removed, leaving unused, "latent" genes as by-products. Note that this approach does not pose a large loss or render the genotype of old versions obsolete.

In one embodiment, a genotype is a data structure containing four one-dimensional arrays, wherein each gene contributes one value to each array. The four arrays are defined as Min, Max, Gene, and Value. Each Gene ranges from 0.0 to 1.0. The Min (minimum) and Max (maximum) define the range to which the corresponding Gene can be mapped to real-world values. Preferably, the Min and Max for each Gene is carefully designed to provide reasonable limits on gene effects, as they interact with each other. Value is a scalar resulting from mapping the Gene to the range defined by the corresponding Min and Max.

The mapping of genes to phenotypic features of an avatar may be accomplished as follows. First, the gene is stored as a scalar in the range of 0.0 to 1.0. The number of bits to which this value is encoded may vary, and may include, for example, an 8-bit fixed point value or a 32-bit floating point value. This representation is stored on disk or in memory in association with the encoded representations of other genes in the form of a genotype. The genotype is then used to display the avatar locally and/or transmitted within the distributed computer environment to other computer systems which display the avatar.

At the point in which avatar phenotype features are expressed (displayed), the gene is mapped to a value (Value) having one of many possible data types, depending on the associated phenotypic feature. The resulting value is then used in any of several possible ways, such as to determine proportions, angles, and/or textures for 3-D body parts of the avatar; to determine amplitudes, phases, and/or frequencies used in generating movement of the avatar (e.g., walking); to blend (or "morph") between two or more 3-D models or animation scripts using a weighting function; to determine when and/or how an animation script is played; or to blend between control points for surface patches. The genotype is extremely small (in terms of data size) in comparison to the 3-D model and motion behavior which it specifies. Consequently, the genotype can be downloaded from, or uploaded to, a server (or other remote machine) much more quickly and easily than a complete 3-D model with animation scripts, as in the case of certain standard technologies such as Virtual Reality Markup Language (VRML). The genotype may also be uploaded or downloaded progressively, as network traffic permits, and as the rendering level of detail requires.

The gene ranges (as defined by the Min and Max arrays) provide an overall genetic space within which all possible avatars can exist. While some of the remote regions of this genetic space may be occupied by some very unusual looking avatars, the space is designed to be largely occupied by a reasonable-looking humanoid avatars. The gene ranges may include both negative and positive numbers. The genes space may be designed such that, for all genes, values midway between the extremes correspond to a generally average-looking humanoid.

The following is a nonexclusive list of the avatar phenotypic features that may be generated based on genes. Each feature listed below may be determined by a separate gene, although certain genes can also influence more than one feature. Thus, the genotype of an avatar may include genes for overall body features, such as: head size, arm length, hair length, hair color, hip width, limb muscularity, skin color, skin tone, leg length, head angle, belly size, crown (head) size, torso length, shoulder slope, chest size, gender, hand size, spine curvature, shoulder pitch (forward or backward), leg thickness, neck thickness, foot size, shoulder width, arm thickness, and neck angle.

In addition, the genotype of an avatar may include genes for facial features, such as: nose length, nose width, nose bridge, nose tilt, eye height, eye width, eye roundness, eye slant, degree of eye color (for each of multiple selectable colors), eyebrow size, eyebrow slant, eyebrow color, mouth width, jaw width, lip color, lip tone, chin size, cheek size, smile shape, and smile size.

In addition, the genotype of an avatar may include genes which affect biomechanical attributes of the avatar (i.e., motion of avatar body parts). For example, the walking motion of an avatar may be determined computationally based on genes for: avatar step rate, arm swing phase, pelvis step roll, step height, elbow swing phase, elbow bend amplitude, pelvis step pitch, arm swing amplitude, step pitch, pelvis step yaw, step roll, up/down bobbing amplitude, step yaw, and forward tilt. These parameters are described further below. Note that genes may alternatively be used to generate walking motion or other motion of an avatar by blending 3-D models or animation scripts, instead of by computation of biomechanical parameters.

Note that complex relationships between genes can be created to impose constraints and interdependencies between avatar features. For example, the interface for customizing the avatar may be designed so that the particular value of one gene limits the allowable range of values of another gene. As a more specific example, the range of possible gene values for an avatar's head size may be automatically limited based on the current gene values for torso length, shoulder width, leg length, and/or other phenotypic features.

Thus, a gene may represent a biometric attribute of an avatar, such as the size, shape, or color of an avatar body part. A gene may also represent a biomechanical attribute of an avatar, such as an amplitude, frequency, or phase of movement of one or more body parts of the avatar (such as during walking). In addition, as described further below, a gene may represent a behavioral attribute of an avatar. Certain genes which represent behavioral attributes influence behavior of the avatar that is not in response to control by its user, such as the (simulated) curiosity of the avatar or the tendency of the avatar to "daydream".

A simulation (virtual world) may include many avatars, each controlled by different user, and each being unique, as determined by its genotype. Each user may modify the genotype of his avatar. In that event, the phenotype of the avatar is updated in real-time on the controlling user's local machine and on any other machine displaying the avatar, including those machines which are remote. This real-time updating of the avatar on all participating machines is facilitated by the compact, efficient structure of the genotype, which can be quickly distributed to all participating machines over the network.

FIGS. 3A through 7B show examples of variations in avatar phenotype that can be achieved through gene selection. The manner in which a given gene is designed to affect particular body parts may be informed by studying common examples of human form and/or motion. Note that the resolution of the aforementioned illustrations is not related to the gene influences. That is, the same permutations can be expressed at higher or lower resolution. FIGS. 3A and 3B show two genetic variations in the size of the crown (upper and posterior portion of the head, excluding the face) of an avatar. In this example, one gene influences some of the geometry of the head.

Figure 5A:
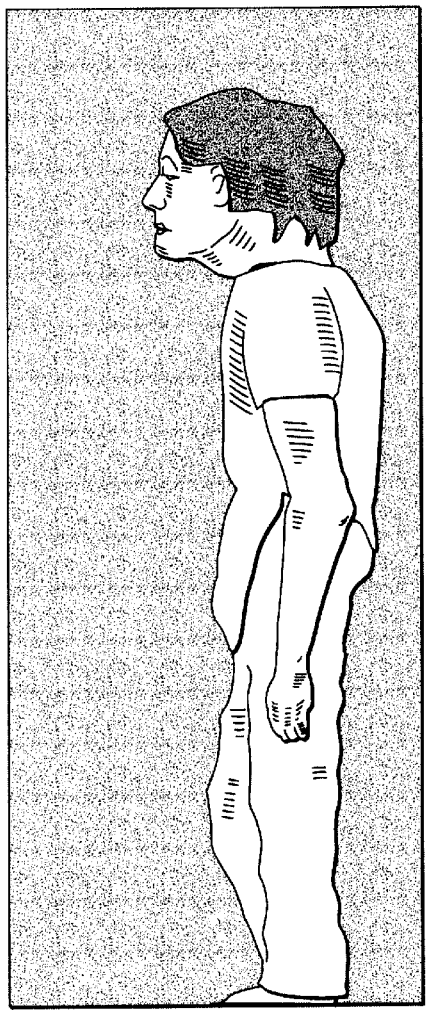
FIGS. 5A and 5B show two genetic variations in the spine curvature of an avatar.
Figure 5B:
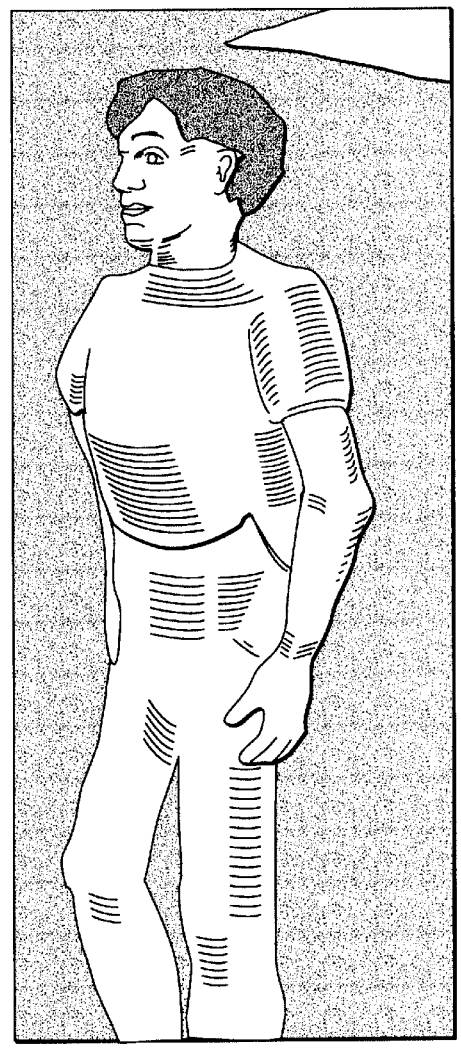
Figure 6A:
FIGS. 6A and 6B show two genetic variations in the eyebrow size of an avatar.
Figure 6B:
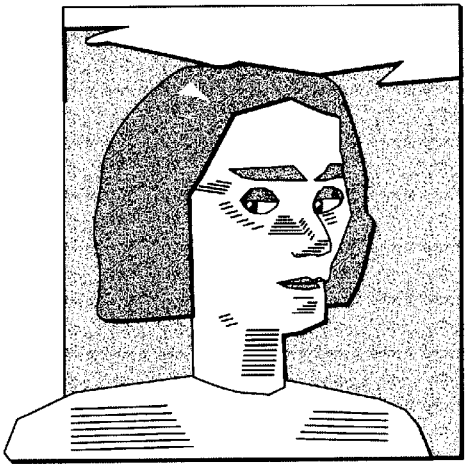
Figure 7A:
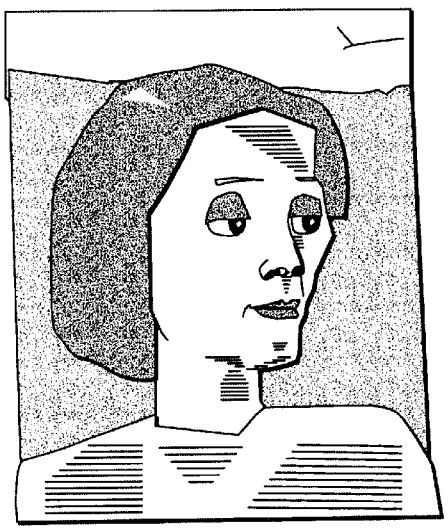
FIGS. 7A and 7B show two genetic variations in the eye characteristics of an avatar.
Figure 7B:
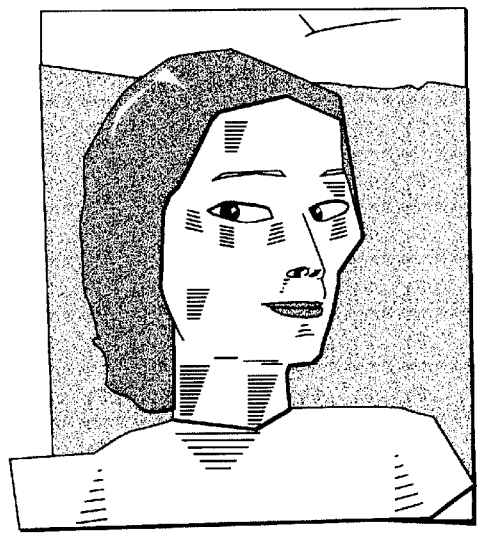

One gene may affect more than one body part. For example, FIGS. 4A and 4B show two genetic variations in the leg length of an avatar. In this example, one gene influences the lengths of several leg bones, e.g., the left and right shins and the left and right thighs. Similarly, FIGS. 5A and 5B show two genetic variations in the spine curvature of an avatar. In this case, one gene determines several bone angles, e.g., for the lower spine, upper spine, neck, and head. FIGS. 6A and 6B show two genetic variations in the eyebrow size of an avatar. FIGS. 7A and 7B show two genetic variations in the eye characteristics of an avatar, such as eye slant, eyelid darkness, eye height, eye width, and eye color.

Avatar genotypes may be designed by, for example, the vendor of the simulation system or a third party vendor, to create a set of default or archetypal avatars. These archetypes may then be customized by the end users or used unmodified by the end users.

To create a complex, highly realistic virtual world; however, it is desirable to have very large numbers (potentially thousands or millions) of unique avatars. Creating such an environment can be difficult if so many avatars (or avatar defaults or archetypes) must be created manually. One solution is to use a pseudorandom number generator to automatically assign the individual values for each gene of each avatar, in order to create a large, statistically diverse population of avatars. In that case, it may nonetheless be desirable to impose certain constraints and/or interdependencies between genes during the process, to ensure that only reasonable-looking humanoid avatars will result.

Figure 8:
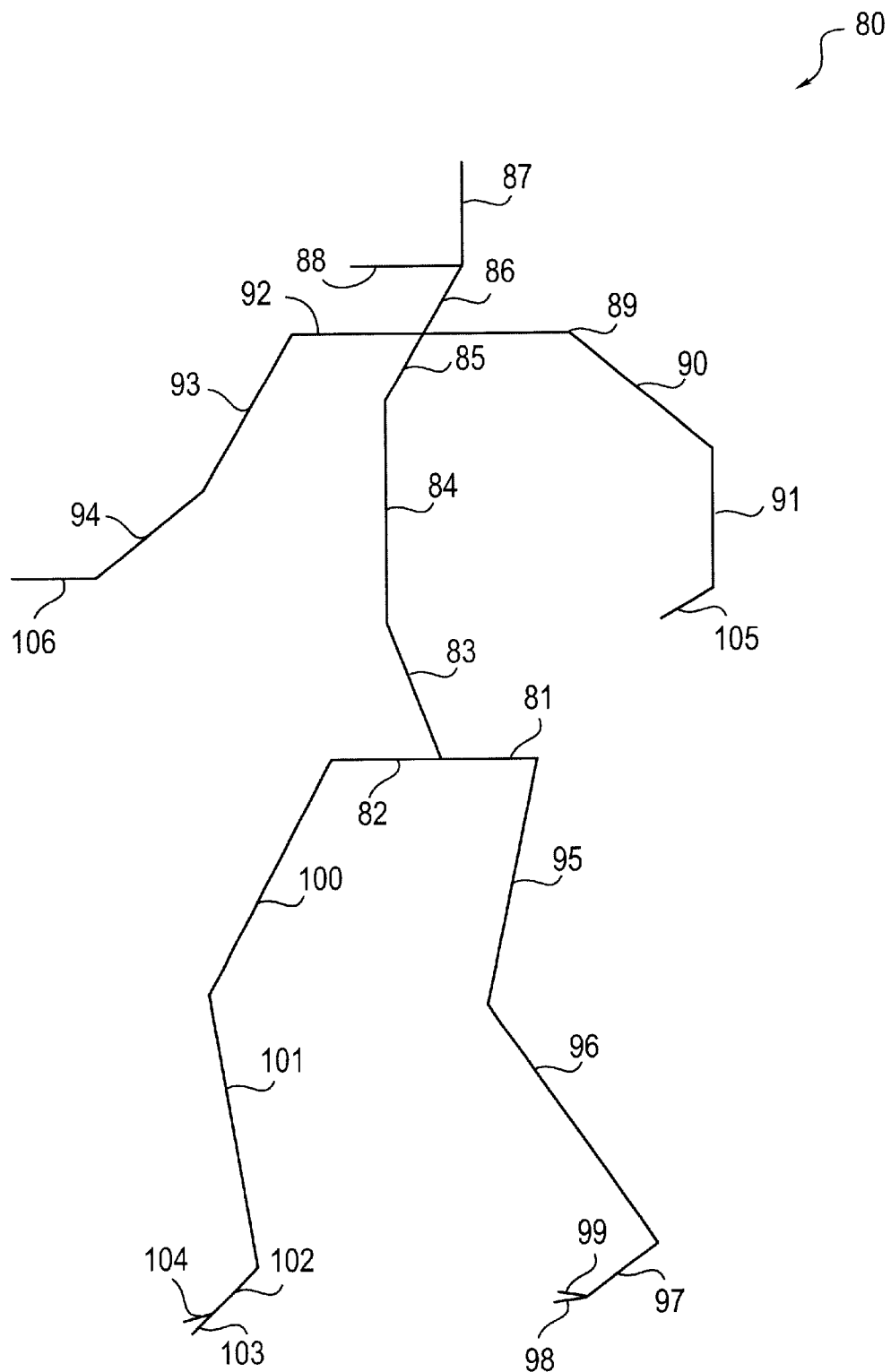
FIG. 8 shows an example of the body topology of an avatar.

An avatar may be generated by generating surfaces over a skeleton. In that case, the skeleton may be used to define the position and orientation of the avatar within the virtual environment. The parts of the skeleton (i.e., the bones) and the surfaces generated over them each may be genetically influenced. FIG. 8 shows an example of the skeletal topology of an avatar. The skeleton is organized as a tree-hierarchical structure in which each bone has a parent. The parent of each part provides the part's base position and orientation (except for an undisplayed special part known as the "parent part", which is the part whose position and orientation are determined by P and O, and serves as the "ancestor" of all other parts).

The following table lists the name of each bone along with its reference numeral and its parent. The parent of the overall structure is the avatar 80.

| Bone Name | Reference Numeral | Parent |
|---|---|---|
| parent | None | (avatar) |
| left pelvis | 81 | parent |
| right pelvis | 82 | parent |
| lower spine | 83 | pelvis |
| mid-spine | 84 | lower spine |
| upper spine | 85 | mid-spine |
| neck | 86 | upper spine |
| head | 87 | neck |
| jaw | 88 | head |
| left shoulder | 89 | upper spine |
| left upper arm | 90 | left shoulder |
| left forearm | 91 | left upper arm |
| right shoulder | 92 | upper spine |
| right upper arm | 93 | right shoulder |
| right forearm | 94 | right upper arm |
| left thigh | 95 | pelvis |
| left shin | 96 | left thigh |
| left foot | 97 | left shin |
| left big toe | 98 | left foot |
| left toes | 99 | left foot |
| right thigh | 100 | pelvis |
| right shin | 101 | right thigh |
| right foot | 102 | right shin |
| right big toe | 103 | right foot |
| right toes | 104 | right foot |
| left hand | 105 | left forearm |
| right hand | 106 | right forearm |

IV. Simulation System

Figure 9:
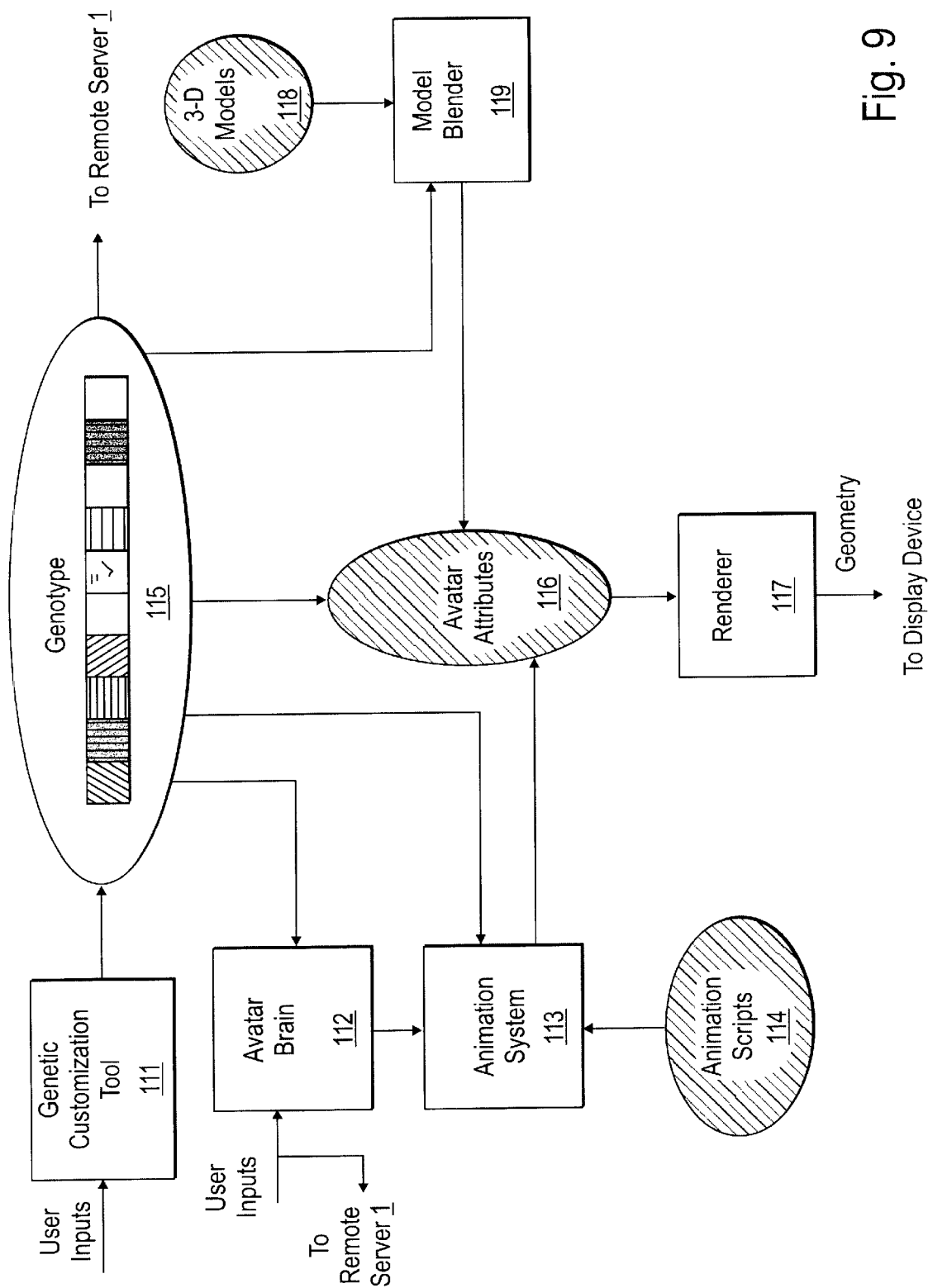
FIG. 9 is a block diagram of a system for generating genetically based avatars.

FIG. 9 is a block diagram of a simulation system that may be used to generate genetically based avatars in the manner described above. The illustrated system may be implemented as software, at least in part, which may be executed in one or more of the clients 2 of FIG. 1. The system includes a genetic customization tool 111, an avatar brain 112, an animation system 113, a set of stored animation scripts 114, the genotype 115 of an avatar representing a local user, a set of avatar attributes 116, a renderer 117, a set of stored 3-D models 118, and a model blender 119. Note that the system may actually contain multiple genotypes corresponding to multiple avatars. However, to simplify this description, only one genotype 115 (corresponding to one avatar) is shown and referred to here.

The genetic customization tool 111 generates a GUI by which the user can customize an avatar by setting or adjusting the values of one or more genes. Accordingly, the genetic customization tool 111 receives user input from the local user and provides output to update the genotype 115. The GUI is described further below. The genotype 115 is used locally, as described below, and is also transmitted over the network 3 (FIG. 1) to the server 1, so that the server 1 can update the state of the avatar. As noted, the server may then distribute the genotype or another indication of the updated state to other machines participating in the simulation.

As noted, the genotype is used to influence a variety of phenotypic features of the avatar. Accordingly, the genotype 115 is input to several modules of the system, as shown. The avatar brain 112 is a module which controls, among other things, the actions of the avatar in response to user inputs from the local user. These actions may include, for example, walking, talking, picking up objects, shaking hands, etc. The user inputs which command these actions are also transmitted to the server 1 over the network 3, to update state on the server 1 and on other machines. These user-commanded actions may be genetically influenced as a result of genes that affect biometric or biomechanical attributes. In addition, the avatar brain 112 may control and maintain state regarding emotions and personality traits of the avatar, such as alertness, curiosity, and tendency to daydream. These personality traits may be genetically influenced.

The avatar brain 112 provides output to the animation system 113, which is described further below. In general, the animation system 113 generates or modifies the avatar attributes 116 in real-time, which may be based on one or more genes, depending on the attribute. The animation system 113 can also use one or more animation scripts 114, which may be in response to user input, to generate movement of the avatar on a frame-by-frame basis. This process may include blending together two or more animation scripts using a weighting that is determined by one or more genes. Blending of animation scripts may be accomplished by, at each frame of the output script, computing a feature (e.g., the position of a body part or an angle) as a weighted function of that feature in the corresponding frames of each of the input scripts.

The animation scripts 114 may include one or more animation script for each type of possible avatar action, such as walking, running, talking, laughing, jumping, etc. The animation scripts 114 may be, for example, the work of an animation artist or the results of sensor-based motion simulation. An example of blending animation scripts is the blending of two predefined walking scripts to generate the current walking motion of the avatar. In some instances, the blending process may be bypassed, such that a single animation script is played to generate a particular action.

Referring still to FIG. 9, the genotype 115 is also input to the model blender 119. The model blender 119 accesses two or more of the stored 3-D models 118 in real-time and blends them together, based on one or more gene values, to generate or modify certain avatar attributes 116. A 3-D model is a data representation of an object (e.g., a part of an avatar) used to display the object so as to convey an impression of depth and/or solid shape, for example, a data representation containing a collection of vertices, surface normals, and polygons connecting the vertices. In some instances, the blending process may be bypassed, such that a single 3-D model is used to generate or update the avatar attributes 116. The blending of 3-D models may be done in a similar manner as for animation scripts, using a weighting function determined by one or more genes.

The avatar attributes 116 are used by the renderer 117 to generate geometry for displaying the avatar on a local display device. A similar process may be performed on the server 1 and/or one or more other clients 2, to generate geometry for displaying the avatar on those machines.

Figure 10:
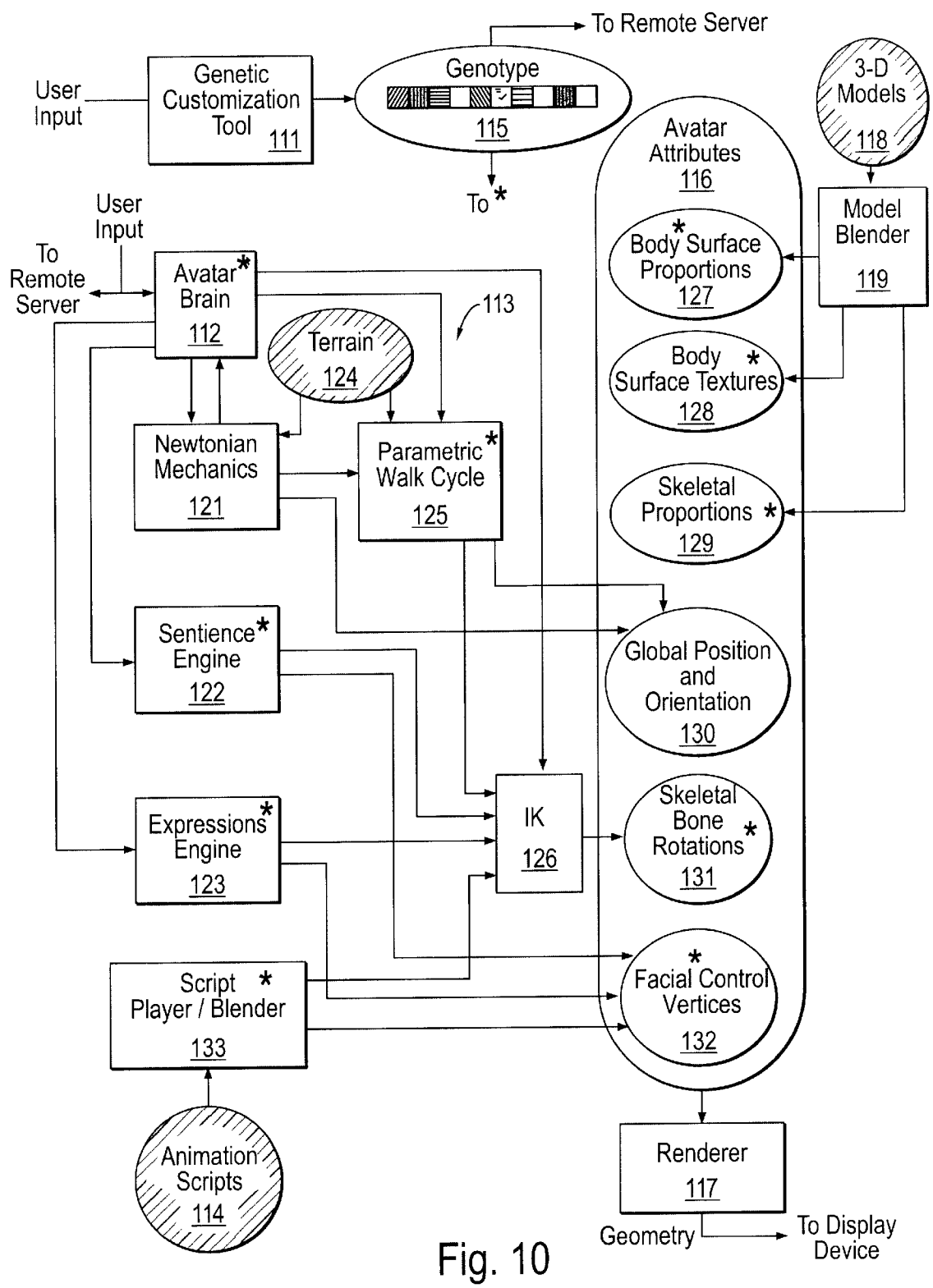
FIG. 10 is a block diagram showing the system of FIG. 9 in greater detail.

FIG. 10 is a block diagram showing the system of FIG. 9 in greater detail, according to one embodiment. In particular, FIG. 10 shows the avatar attributes 116 and the animation system 113 in greater detail. Several of the elements showed FIG. 10 may use, or may be affected by, one or more genes of the genotype 115. Accordingly, such elements are identified with an asterisk ("*") in FIG. 10. The avatar attributes include body surface proportions 127 of the avatar, body surface textures 128 of the avatar, skeletal proportions 129 of the avatar's skeleton, global position and orientation 129 of the avatar, skeletal bone rotations 131, and facial control vertices 132. Each of the illustrated avatar attributes 116 may be affected by the genotype 115, with the exception of the global position and orientation 130 of the avatar. The global position and orientation 130 is determined by the Newtonian mechanics module 121, which is part of the animation system 113.

The model blender 119 uses one or more of the 3-D models 118 to generate or modify the body surface proportions 127, the body surface textures 128, and the skeletal proportions 129. The skeletal bone rotations 131 are determined by various sources and then modified, if appropriate, by the Inverse Kinematics (IK) module 126 in the animation system 113. The facial control vertices 132 are determined by both the expressions engine 123 and the script player/blender 133 in the animation system 113.

As shown, the animation system 113 includes the Newtonian mechanics module 121, a sentience engine 122, an expressions engine 123, a script player/blender 133, a set of stored terrain data 124, a parametric walk cycle module 125, and the IK module 126. The Newtonian mechanics module 126 is responsible for causing the avatar to fall to the ground or to stay on the ground due to (simulated) gravity, to have angular momentum, to respond to outside forces, such as wind, water, and collisions with other objects, and to respond to forces such as user input for actions such as walking and jumping. The Newtonian mechanics module 126 receives input from the avatar brain 112 (e.g., representing user inputs for controlling the avatar) and also inputs the terrain data 124 representing the ground configuration of the avatar's virtual environment. Based on these inputs, the Newtonian mechanics module 121 provides output to the parametric walk cycle module 125 to determine, for example, whether the walking speed of the avatar or whether the avatar is on the ground. In addition, the Newtonian mechanics module 121 determines the global position and orientation 130 of the avatar.

The sentience engine 122 controls personality-based behaviors of the avatar, such as alertness, shiftiness, curiosity, and tendency to daydream. The output of the sentience engine may be used to generate or modify the facial control vertices 132 and is also output to the IK module and 26 for purposes of determining the skeletal bone rotations 131. The operation of the sentience engine 122 is described further below.

The IK module 126 modifies the skeletal bone rotations 131, if appropriate, so as to realistically depict interactions between body parts of the avatar and other objects, so that such interactions visually adhere to the laws of physics. For example, the IK module 126 may be used to set the orientations of the thighs and shins of the avatar, so that the foot displaced as close as possible to the ideal foot position when contacting the ground. Similarly, when the avatar shakes hands with another avatar, the IK module 126 may be used to set the orientation of the avatar's hand so as to appropriately contact the hand of the other avatar. The IK module 126 receives input from the avatar brain 112, the parametric walk cycle module 125, the sentience engine 122, the expressions engine 123, and the script player/blender 133.

The expressions engine 123 is used to generate the facial expressions of the avatar and a variety of bone rotations related to expressions (i.e., shoulders shrug, cocking the head, etc.). Accordingly, the expressions engine 123 receives input from the avatar brain 112 to generate or modify the facial control vertices 132, and to provide output to the IK module 126 for setting skeletal bone rotations. The expressions of the avatar may be generated by direct user control or automatically by the system as a result of simulated emotions of the avatar (e.g., as determined by the avatar brain 112).

The script player/blender 133 is used to play animation scripts and to blend two or more animation scripts 114 in the manner described above. As noted, the blending of scripts may be used to depict essentially any action of the avatar, such as walking, laughing, etc. Accordingly, the script player/blender 133 can generate or modify the facial control vertices 132 and provides output to the IK module 126 for setting skeletal bone rotations 131.

The parametric walk cycle module 125 is used to computationally generate the positions and orientations of the avatar's limbs to show the avatar walking as well as to displace the position and orientation of the avatar. This module operates by generating the walk cycle of the avatar as a matter of parametric computation, i.e., generating the positions and orientations of the avatar's body parts using a set of parametric equations that are functions of the avatar's genes. This is in contrast with the alternative approach, described above, of generating walking motion using one or more animation scripts 114. The operation of the parametric walk cycle module 125 is described further below. Thus, the illustrated system includes two alternative ways of showing the avatar walking, i.e., parametrically, using the parametric walk cycle module 125, or using the animation script player/blender 133 to play/blend one or more animation scripts. In particular embodiments, however, either of these two approaches with their corresponding modules may be omitted in favor of the other.

Figure 11:
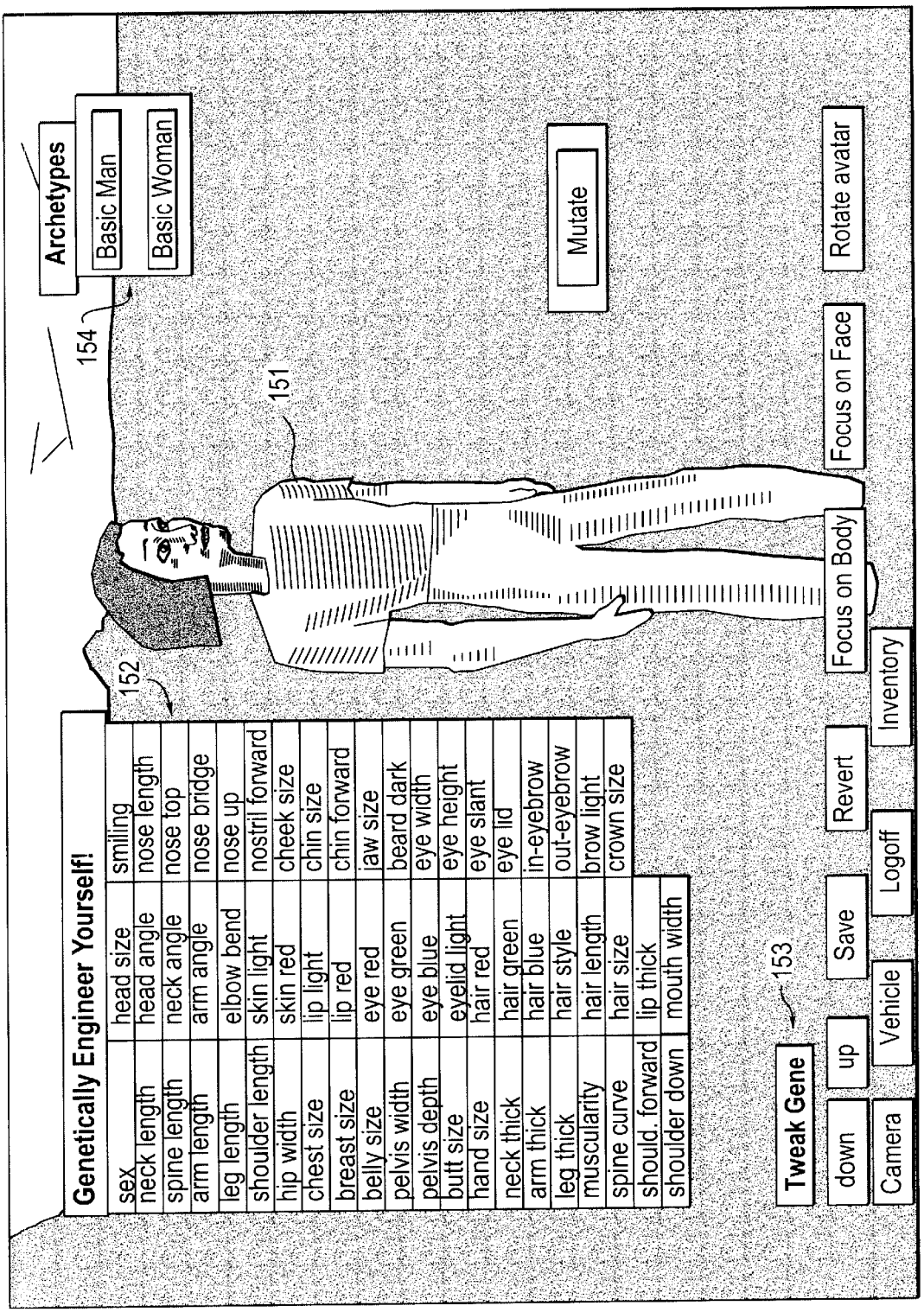
FIG. 11 shows a Graphical User Interface (GUI) for customizing an avatar.

FIG. 11 shows an example of a GUI for customizing an avatar. This GUI may be generated by the genetic customization tool 111, and may be displayed on a display device of a client system of a user desiring to customize his avatar. The GUI includes a control interface 154 (e.g., soft buttons) to allow the user to select from among various avatar archetypes, such as "basic man" or "basic woman". Of course, other archetypes are possible. The selection may be made using any conventional input device of the client system, such as a mouse or keyboard. Once selected, the avatar 151 is displayed according to the user's selection. The user may then select any of the various genes 152 of the avatar, and modify the values of the selected genes using a control interface 153. In response to modifying the gene values, the genotype of the avatar 151 is modified in real-time, and the avatar 151 is visually modified on the display in real-time.

The GUI also provides a control to allow the user to save the avatar's current gene settings (genotype). When the user saves the gene settings, the genotype of the avatar is transmitted to the server 1 and/or other client systems participating in the simulation. As a result, the avatar 151 is also updated in real-time on each other system that is tracking the state of the avatar. The GUI also allows the user to focus on either the body or the face of the avatar, in which case additional genes specifically applicable to those portions of the avatar are displayed. The user may also rotate the avatar in 3-D to view the avatar from various angles.

Figure 14:
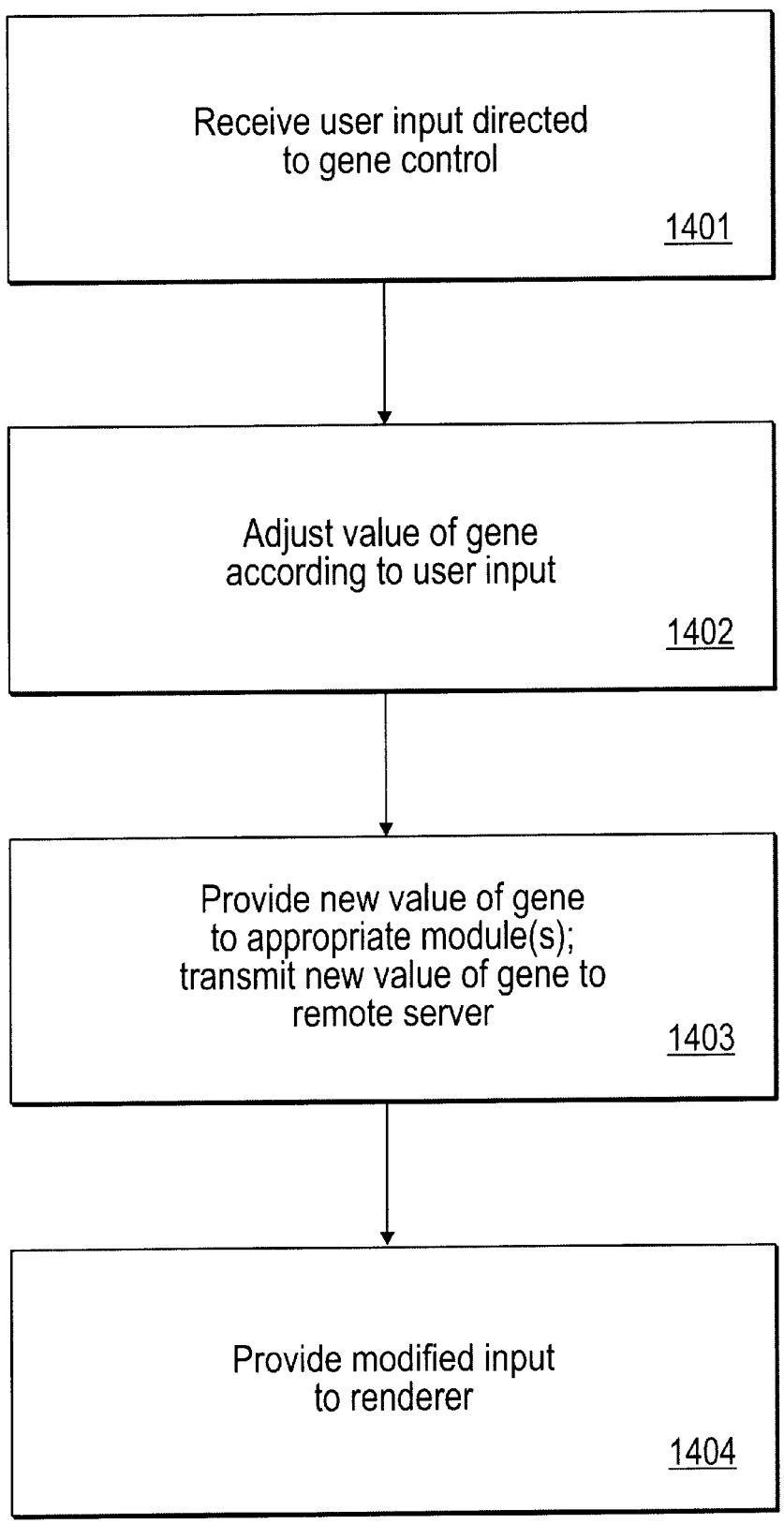
FIG. 14 is a flow diagram of a process for customizing an avatar genotype.

FIG. 14 shows a process that may be implemented by the simulation system (FIGS. 9 and 10) within a client 1 (FIG. 1) to allow a user to customize the genotype of an avatar. At 1401, the genetic customization tool 111 receives input from the user directed to a GUI control for setting or adjusting the value of a particular gene. This input may be, for example, the act of pressing a soft button, moving a slider bar, or typing in a numerical value. At 1402, the value of the gene is adjusted according to the user input. At 1403, the new value of the gene is then provided by the genetic customization tool 111 to one or more other modules of the simulation system, depending on the gene. Also at 1403, the value of the gene is transmitted (as part of the genotype) to the server 1 (FIG. 1), or to any other processing system which requires this information. At 1404, the appropriate module or modules provide their respective inputs to the renderer 117 according to the new gene value.

Figure 15:
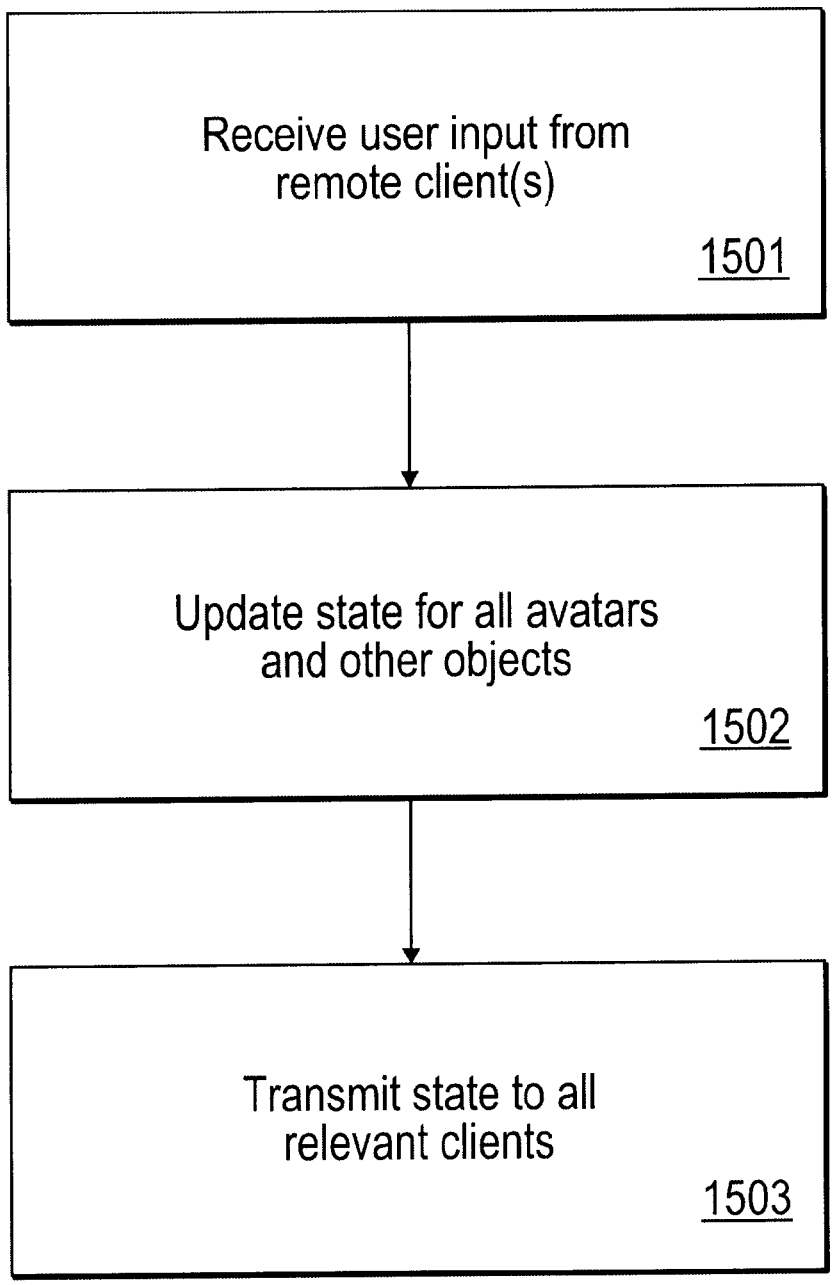
FIG. 15 is a flow diagram of a server-implemented process for a distributed simulation environment.

FIG. 15 is a flow diagram of a process that may be implemented within the server 1 in conjunction with the process of FIG. 14. As noted above, the server 1 keeps track of the state of all objects in the simulation, and provides updates of state to the clients 2 participating in the simulation. Hence, at 1501 the server 1 receives user inputs from one or more of the clients 2, via the network 3. These user inputs include inputs for controlling avatars representing users. At 1502, the server 1 updates state for all avatars and other objects in the simulation. At 1503, the server 1 transmits the updated state to the clients 2. This act 1503 may include distributing over the network 3 an avatar genotype received from one client 2 to various other clients 2.

V. Parametric Walk Cycle

As noted, the parametric walk cycle module 125 generates the walk cycle of an avatar computationally using genetic parameters. The operation of this module will now be further described. Again, the parametric walk cycle module 125 is optional, in that avatar walking motion can alternatively be generated using animation scripts. The position P and orientation O of the avatar determine where the avatar exists in the virtual world and how its body is oriented. The position P may be assumed to correspond to the center of the avatar's pelvis (See FIG. 8). The articulated body (all of the separate parts) constitutes an articulated model, the base orientation and position of which are determined by P and O. The position P is a 3-D vector, and O is an orientation matrix determined by a rotation matrix R, which is updated by a rotation "delta" (increment) RD. The avatar also has a linear velocity V, which is also a 3D vector.

When the avatar is walking, the articulated body is animated along with the changes in the position P and orientation O. Each body part has a position and orientation. As described above, the body parts of the avatar are connected in a tree hierarchy, i.e., each part has a parent part, which provides the part's base position and orientation (except for a special part known as the "parent part", which is the part whose position and orientation are determined by P and O, and serves as the "ancestor" of all other parts). Each part also possesses a yaw, pitch, and roll angle, which determine the rotation of the part on its pivot point, in relation to its parent part.

The parametric walk cycle module 125 implements three sinusoidal "motors" for each body part involved in the walk cycle. These motors may be simply sinusoidal functions, which can be compared to real-world motors which cause the parts (e.g., arms, legs, pelvis) to rotate back and forth in a pendulum-like manner. These motors cause the affected body part to rotate in each of the yaw, pitch, and roll degrees of freedom. An example of the form of these motors is "forearm_yaw=forearm_resting_yaw+forearm_yaw_amplitude*sine (forearm_yaw_frequency*time step+forearm_yaw_phase)", where time_step represents the time value associated with the current point in time in the simulation.

The amplitudes, frequencies, and/or phases of these motors may be functions of genes of the avatar. Thus, any of the following gene-determined parameters may affect body part rotations during the parametric walk cycle:

Forward tilt—the magnitude of a rotational offset to the overall pitch

Step yaw—a rotational offset to the parent part yaw motor

Step pitch—a rotational offset to the parent part pitch motor

Step roll—a rotational offset to the parent part roll motor

Pelvis Step yaw—a rotational offset to the pelvis yaw motor

Pelvis Step pitch—a rotational offset to the pelvis pitch motor

Pelvis Step roll—a rotational offset to the pelvis roll motor

Arm Bend Amount—amplitude of the upper arm pitch

Arm Splay Amount—amplitude of the upper arm roll

Arm Swing Amount—amplitude of the upper arm pitch motors

Arm Swing Phase—a phase-offset to the pitches of the upper arm motors

Elbow Bend Amount—amplitude of the forearm pitch

Elbow Swing Amount—amplitude of the forearm pitch motors

Elbow Swing Phase—a phase-offset to the pitches of the forearm motors

Figure 16:
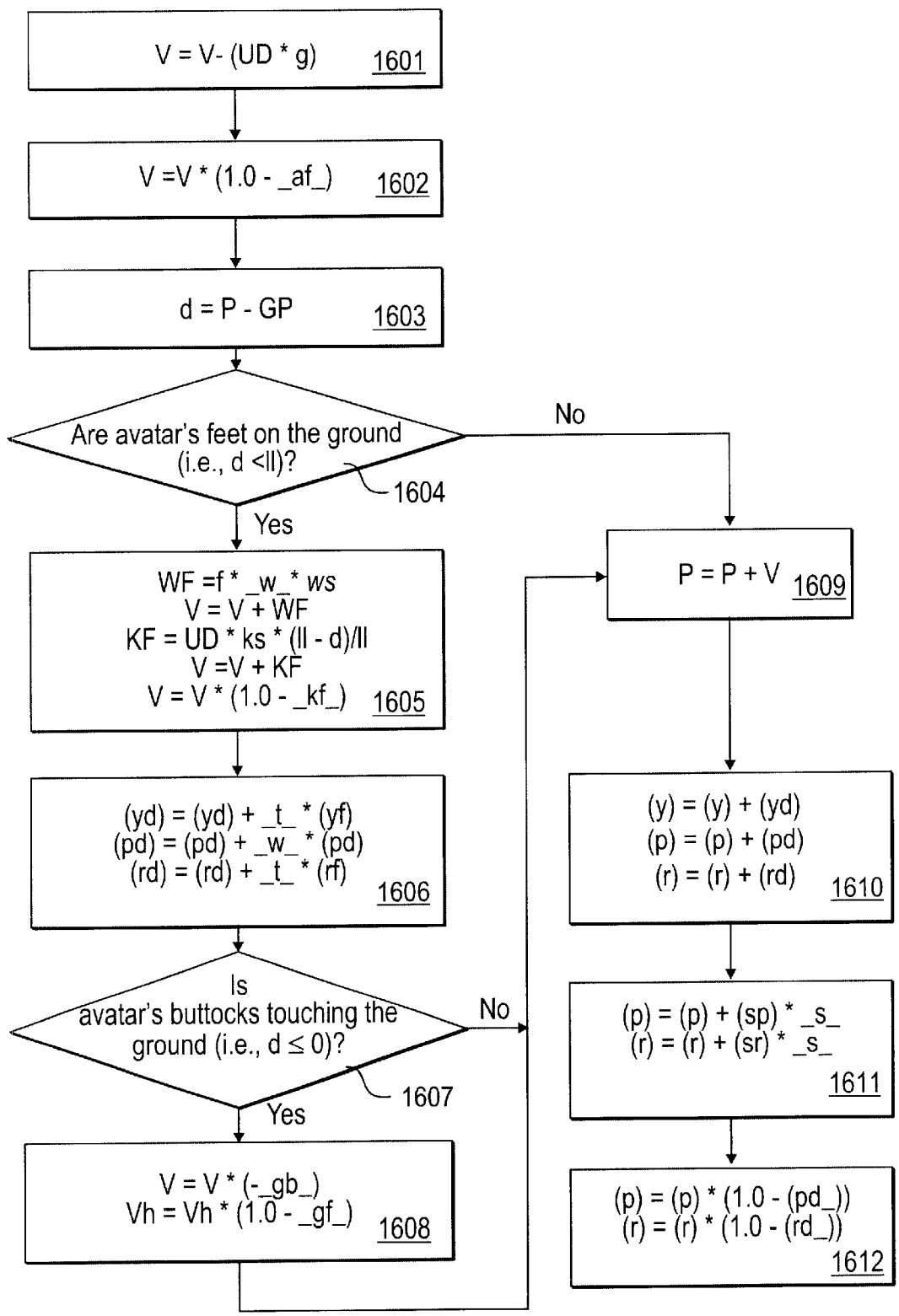
FIG. 16 shows a process by which the parametric walk cycle module can determine the position and orientation of an avatar, using genetic parameters.

Another aspect of walking is the placement of the feet on the ground, picking them up, and moving them towards the next position, and so on. The IK module 126 (FIG. 10) orients the leg parts according to these stepping foot positions during parametric walk cycle computation. To that end, certain additional gene-determined parameters may be used in computing the stepping action, such as:

Stepping height—how high above the ground a foot is raised as it moves from one stepping position to the next Stepping Rate—the frequency of the stepping—this has a global effect on the whole body in that it sets the frequency of the body part motors Stepping Splay—how far apart the feet are when walking FIG. 16 shows a process by which the parametric walk cycle module 125 can determine the position P and orientation O of an avatar, using genetic parameters. Before discussing this process, however, it is useful first to define certain variables and notation conventions used in the process. The notation conventions are as follows: Capital letters (e.g., P and V) denote 3D vectors, except for the orientation O of the avatar, which is a 3×3 matrix. Lower-case letters (e.g., kf) denote scalars (real numbers). Scalars that are normalized (ranging between 0 and 1) have an underscore character ("_") appended to them as a suffix (e.g., d_, or g_). Scalars which range between −1.0 and 1.0 have underscore characters appended to them as both a prefix and a suffix (e.g., _, s_fg_). Orientations (e.g., O) consist of complete orientation matrices, i.e., nine real numbers representing three normalized, orthogonal vectors. The three components of an orientation matrix are labeled _f_, _r_, and _u_. In the case of the avatar's orientation O, these components represent the avatar's local front direction, right direction, and up direction respectively. Angles are shown in parentheses, e.g., "(y)". Genetic affectors are denoted with an asterisk ("*"). Note, however, that other variables may be genetic affectors in other embodiments.

Hence, the following variables apply to the parametric walk cycle process:

Constant Normalized Vectors:
UD up direction

Dynamic Normalized Vectors:
f front component of O
r right component of O
u up component of O Dynamic Forces:
KF knee force (an upward-directed vector, the magnitude of which is proportional to the distance between the ground and the buttocks of the avatar, if the distance it is less than the leg length, and then scaled by a knee-bend force value)
WF walking force Constant Scalars:
kf_ knee friction*
ks knee strength*
af_ air friction
gb_ ground bounce*
gf_ ground sliding friction
ll length of extended leg*
g gravity
ws walking speed*
pd_ pitch decay*
rd_ roll decay*

Dynamic Scalars:
d distance between P and ground position directly below P
_w_ walking force (a scalar value created by user input, generated from the y velocity component of the simulation input device, e.g., joystick, mouse, keyboard, etc.)
_t_ turning force (created by user input from the simulation input device)
_s_ stepping factor (a sine wave corresponding to step rhythm)

Velocities:
V avatar velocity
Vh horizontal component of V

Positions:
P avatar position (center of the pelvis)
GP position on ground directly below P Orientations:
O avatar orientation Constant Angles (in Degrees):
(sp) step pitch*
(sr) step roll*
(yf) yaw force*
(pf) pitch force*
(rf) roll force*

Dynamic Angles (in Degrees):
(y) avatar yaw rotation
(p) avatar pitch rotation
(r) avatar roll rotation
(yd) yaw delta (change in yaw)
(pd) pitch delta (change in pitch)
(rd) roll delta (change in roll)

The walking force WF is used to generate a value referred to as "walk energy", more specifically, to scale the walk energy by some multiple. The walk energy modulates the amplitudes of all of the periodic walk cycle motors mentioned above.

Refer now FIG. 16. The illustrated process is performed at each simulation time step. Initially, at 1601, the linear velocity V of the avatar is computed according to equation (1).

$$V=V-(UD*g) \qquad (1)$$

Note that in this description, the standard computer programming convention is used in which an expression of the form "variable=variable+number" means that the new "variable" is set equal to the sum of the previous value of "variable" and "number".

At 1602, the velocity V is updated according to equation (2).

$$V=V*(1.0-\_af\_) \qquad (2)$$

At 1603, the distance d between the avatar position P and the ground position directly below P is computed according to equation (3).

$$d=P-GP \qquad (3)$$

If the avatar's feet are on the ground (i.e., d<leg length, ll) at 1604, then the process continues from 1605; otherwise, the process continues from 1609. At 1605, the walking force WF, velocity V, and knee force KF are computed according to equations (4), (5), and (6), respectively. Then, the velocity V is again updated, first according to equation (7), and then according to equation (8).

$$WF=f*\_w\_*ws \qquad (4)$$

$$V=V+WF \qquad (5)$$

$$KF=UD*ks*(ll-d)/ll \qquad (6)$$

$$V=V+KF \qquad (7)$$

$$V=V*(1.0-\_kf\_) \qquad (8)$$

Next, at 1606, the yaw delta (yd), pitch delta (pd), and roll delta (rd) are computed according to equations (9), (10), and (11), respectively.

$$(yd)=(yd)+\_t\_*(yf) \qquad (9)$$

$$(pd)=(pd)+\_w\_*(pd) \qquad (10)$$

$$(rd)=(rd)+\_t\_*(rf) \qquad (11)$$

If the avatar's buttocks are touching the ground (i.e., d<0) at 1607, then the process continues from 1608; otherwise, the process continues from 1609. At 1608, the velocity is updated according to equations (12), as a function of ground bounce _gb_. In addition, the horizontal component Vh of the elocity V is computed according to equation (13).

$$V=V*(-\_gb\_) \qquad (12)$$

$$Vh=Vh*(1.0-\_gf\_) \qquad (13)$$

At 1609, the position P of the avatar is updated according to equation (14).

$$P=P+V \qquad (14)$$

At 1610, the avatar yaw rotation (y), pitch rotation (p), and roll rotation (r) are computed according to equations (15) through (17), respectively.

$$(y)=(y)+(yd) \qquad (15)$$

$$(p)=(p)+(pd) \qquad (16)$$

$$(r)=(r)+(rd) \qquad (17)$$

At 1611, the avatar pitch rotation (p) and roll rotation (r) are updated according to equations (18) and (19), respectively.

$$(p)=(p)+(sp)^*\_s\_ \qquad (18)$$

$$(r)=(r)+(sr)^*\_s\_ \qquad (19)$$

Finally, at 1612, the pitch rotation (p) and roll rotation (r) are again updated according to equations (20) and (21), respectively.

$$(p)=(p)^*(1.0-(pd\_)) \qquad (20)$$

$$(r)=(r)^*(1.0-(rd\_)) \qquad (21)$$

Thus, the position and orientation of the avatar can be determined by performing the above process at each simulation time step. This process can be supplemented by generating various bone rotations associated with walking, such as for the hips, elbows, and spine.

VI. Sentience

The simulation system may allow the avatar to have certain behaviors or traits that are not directly controlled by user input. These behaviors or traits can represent simulated "sentience" of the avatar. One reason this functionality may be desirable is to provide greater realism, so that the avatar is not completely motionless (and, therefore, seemingly catatonic) when the user is not providing input. Consequently, the avatar may possess certain personality traits that determine these behaviors independently of any direct user control. These personality traits may be influenced by the avatar's genotype. Examples of these personality traits are alertness, shiftiness, curiosity, and tendency to daydream, as will now be further described. Thus, while the user can indirectly influence these personality traits (and, therefore, the corresponding behaviors) by setting the values of corresponding genes, the user does not directly cause or control the corresponding behaviors.

Certain ones of these personality traits can be expressed by causing appropriate movement of the head and/or eyes of the avatar in response to certain types of stimuli or lack of stimuli, but independently of any direct user control. Therefore, before further discussing these personality traits, it is useful to discuss the gaze system of the avatar, which determines the movement of the head and eyes. The gaze system allows the avatar to look at various points in the virtual world. For instance, if the avatar wants to look at the eyes of another avatar, the orientations of the head and eyes may need to be different from what they are normally. Therefore, the gaze behavior takes over such cases by rotating the head and/or eyes appropriately.

Figure 12:
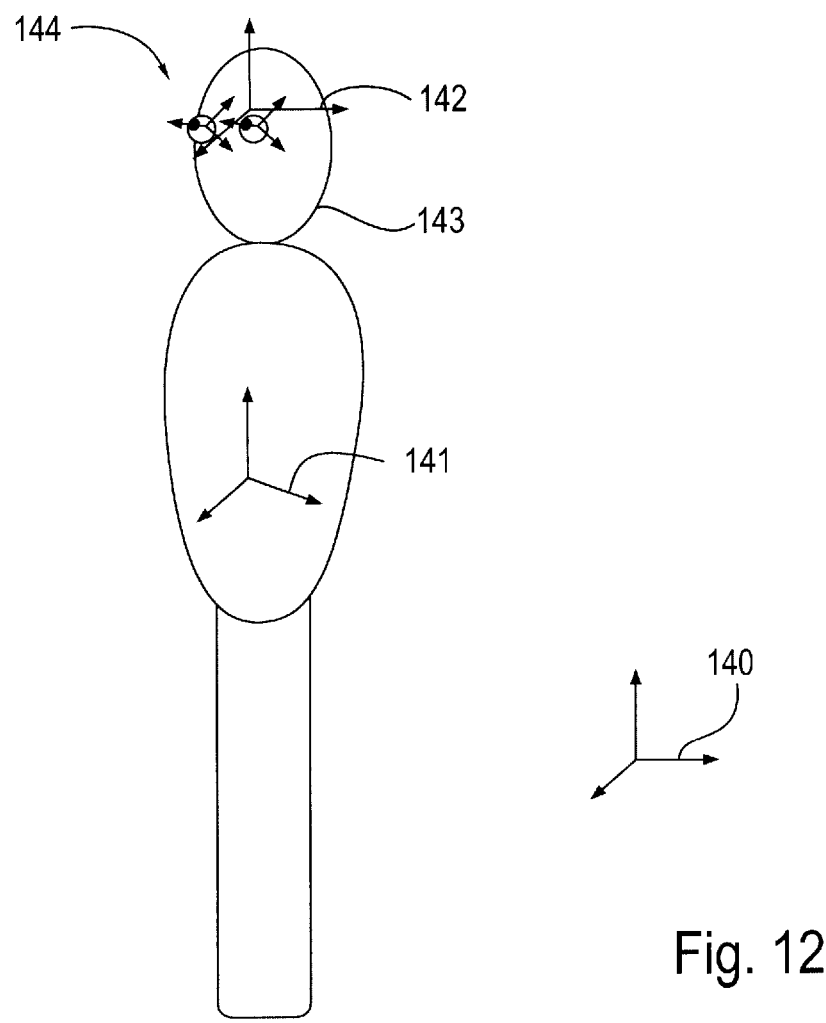
FIG. 12 illustrates coordinate systems associated with an avatar.

An important aspect of avatar gaze is the relative orientations of body parts, particularly the head and eyes. FIG. 12 shows four orientations, roughly in order of parental hierarchy: the world coordinates system 140, the avatar body orientation 141, the avatar head orientation 142, and the avatar eye orientations 144. Under normal circumstances, each orientation is defined as a rotation relative to its parent's coordinates system. More specifically, there is a hierarchy of body parts between the body (or, "parent bone") and every other part. The head orientation 142 is set relative to the neck orientation, by default, which is in turn set relative to the upper spine orientation, and so on, down to the parent bone. However, when the avatar is engaging in gaze behaviors, the head and eye orientations 142 and 144 violate this constraint. This departure from hierarchical constraints exists as long as the relative orientations of parent part to child part do not exceed specified limits. The same is true of the eyes in relation to the head.

A. Alertness

Figure 13:
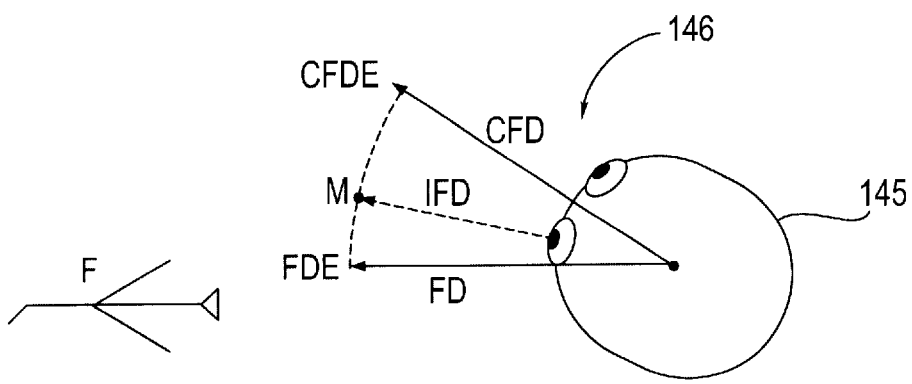
FIG. 13 illustrates the operation of the gaze system of an avatar.

Alertness can be simulated by controlling the speed at which the head of the avatar rotates toward a point of interest ("focus point") in the virtual environment. The head of the avatar may be turned in response to a control input from the user or in response to some other stimulus that is independent of the user. In either case, however, the speed at which the head turns, i.e. the alertness, is not directly controlled by the user. Rather, the speed is only indirectly influenced by the user through setting the alertness gene. Referring to FIG. 13, when the alertness gene is high, the head rotates toward a focus point F more quickly than when the alertness gene is low. FIG. 13 schematically shows the head 145 and eyes 146 of an avatar, viewed from above the avatar. The focus point F may be any 3-D point in the virtual world which the avatar wants to look at, such as a bird. When gazing, the orientation of the head may be updated using a non-Newtonian force analogous to a physical spring. Assume, for example, the avatar is tracking a bird in the sky (F), and the bird is darting around. The avatar's head orientation is continuously catching up to the bird. The head orientation is, at any given time, adapting itself so as to be more accurately aiming at the bird.

Referring still to FIG. 13, the focus point F is used to determine a 3-D vector FD originating from the head position (e.g., the center of the head) and pointing towards the focus point F. The front vector of the current head orientation is referred to as CFD. This vector CFD defines where the avatar's head is aimed. The end of the front vector CFD is a position referred to as point CFDE. The end of vector FD is a position referred to as point FDE.

Figure 17:
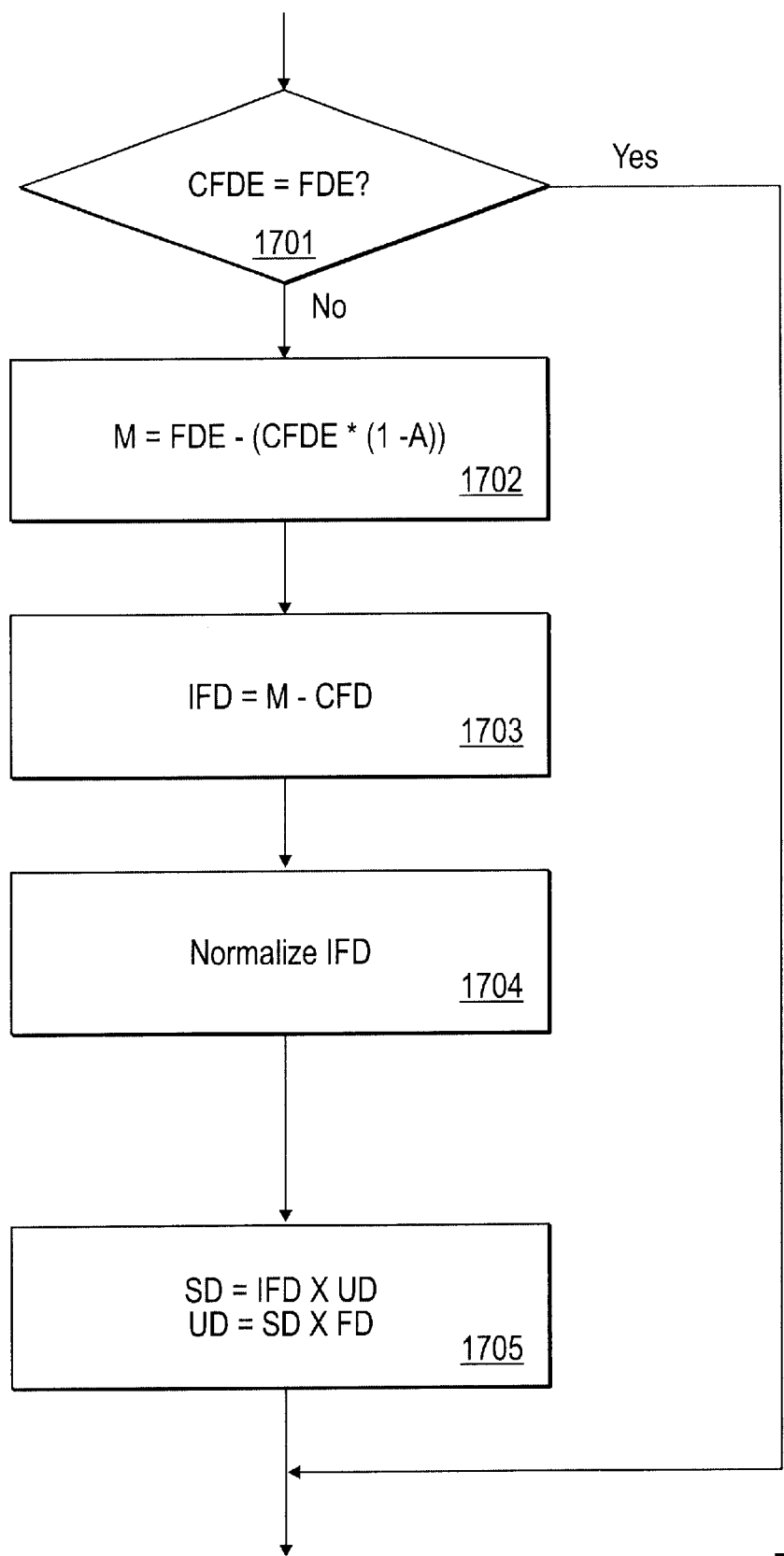
FIG. 17 is a flow diagram of a process for genetically controlling the alertness of an avatar.

FIG. 17 shows a process for adjusting the gaze of the avatar toward a focus point F, based on the alertness gene. This process is repeated at each simulation time step. The process may be implemented within the sentience engine 122 (FIG. 10). Referring to both FIGS. 13 and 17, if the point CFDE is not equal to point FED at 1701, event at 1702 and intermediate focus point M is computed between CFDE and FED, weighted by the alertness gene value A. For example, point M may be computed as M=FED−(CFDE*(1−A)). Thus, if the alertness A is set at 0.0, then M is computed to be equal to CFDE. If the alertness A is set at 1.0, then M is computed to be equal to FED. Next, at 1703, an interpolated focus direction vector IFD is computed as IFD=M−CFD, i.e., by subtracting the head position from M. IFD is then normalized at 1704, and a complete orientation matrix for the head is then built at 1705. The orientation matrix O is computed, in part, by computing the vector cross product of IFD and the normalized global up direction UD, to create a final, normalized side direction SD. In addition, the vector cross product of SD and FD is computed to form a new global up direction UD orthogonal to both FD and SD. SD and the new UD then form the new orientation matrix of the head.

The eyes may be updated similarly to the head, as described above. However, it may be preferable that the eyes are not moved incrementally, in which case there is no need to compute intermediate points M as described. That is, the movement of the eyes is the same as that of the head when the alertness A is set to 1.0.

B. Shiftiness

An avatar may also have a "shiftiness" trait. In real-life, a person who is "shifty" (crafty, tricky, or untrustworthy) is sometimes stereotypically represented as looking toward a point of interest by moving his eyes without moving his head (sometimes with narrowed eyes), or by moving his eyes more than he moves his head. Hence, an avatar may have an analogous personality trait, referred to as shiftiness. Accordingly, the eyes of the avatar are designed to rotate independently of the head, and the shiftiness of the avatar refers to the relative speeds or amounts by which the eyes rotate toward a point of interest with respect to the head. For example, when the shiftiness gene is high, the head turns relatively little toward a focus point, so that the eyes do most of the turning.

C. Curiosity

The curiosity of the avatar is the tendency of the avatar to look toward a an object or event when nothing important is happening in the avatar's immediate vicinity. Thus, the curiosity gene determines the tendency of the avatar to look, automatically (i.e., independently of any user control), toward a low-priority stimulus (e.g., a cat walking slowly by or a new avatar appearing in the distance) in the absence of a high-priority stimulus (e.g., a control input from the user or an object being thrown toward the avatar). A high value of the curiosity gene corresponds to a high tendency for the avatar to respond to a low priority stimulus. Curiosity may also determine the tendency for the head to roll by small degrees, as in the curious cocking of the head in a new situation.

Figure 18:
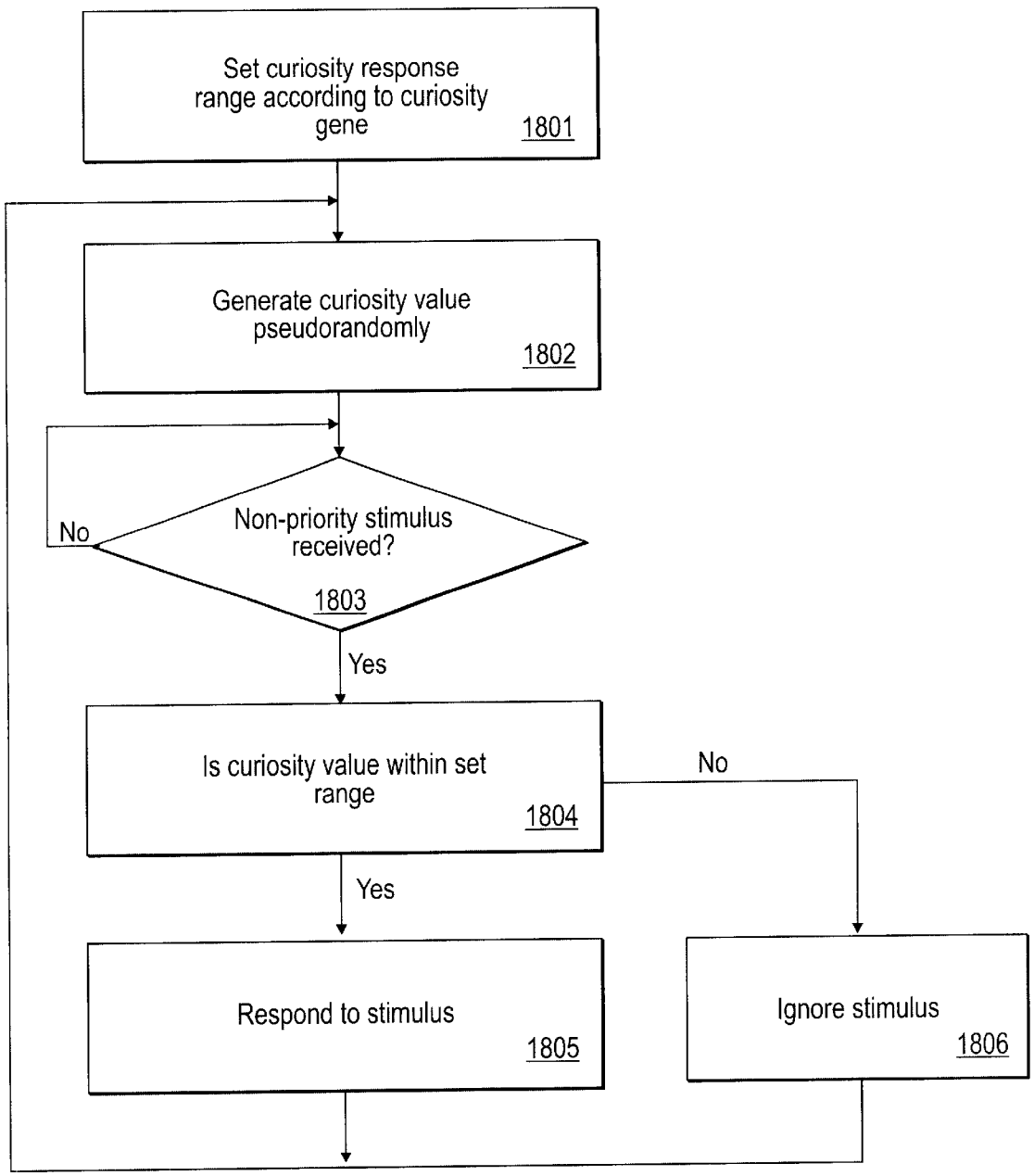
FIG. 18 is a flow diagram of a process for genetically controlling the curiosity of an avatar.

FIG. 18 shows a process for genetically controlling the curiosity of an avatar. The process may be implemented within the sentience engine 122 (FIG. 10). At 1801, a curiosity response range is set according to the curiosity gene. At 1802, a curiosity value is generated using a pseudorandom number generator. When the next non-priority stimulus is detected (1803), a determination is made at 1804 of whether the curiosity value is within the previously set curiosity response range. A "non-priority stimulus" is an event occurring in the virtual world, other than a direct user input for controlling the avatar or a something significant occurring close to the avatar. The criteria for deciding whether an event is "significant" or "close to" the avatar are discretionary; any reasonable criteria may be used. If the curiosity value falls within the set range, then the avatar is caused to respond to the stimulus at 1805, and the process then repeats from 1802. If, however, the curiosity value is outside of the set range, then the avatar ignores the stimulus at 1806, and process then repeats from 1802. The specific manner in which the avatar responds to a non-priority stimulus is discretionary and may be made to depend on the nature of the stimulus. For example, the response may simply entail turning the avatar's head and/or eyes to look at a focus point.

Of course, as with the other processes described herein, many variations upon this process are possible. For example, rather than using a pseudorandom number generator, a simple yes or no decision can be made pseudorandomly to decide whether the avatar should respond to each non-priority stimulus. In yet another embodiment, a number of consecutive non-priority stimuli are ignored by the avatar, where that number is determined based on the curiosity gene value. In the extremes of that case, a curiosity gene value of 0 (low curiosity) may result in all non-priority stimuli being ignored by the avatar, while a curiosity gene value of 1.0 (high curiosity) may result in the avatar responding to all non-priority stimuli.

D. Daydreaminess

An avatar may also have a "daydreaminess" attribute. Daydreaminess is the tendency of the avatar to appear to daydream when nothing important is happening in the avatar's vicinity. In one embodiment, daydreaming is depicted as the avatar looking upwards and/or slightly to the side and/or blinking frequently. This behavior is intended to simulate human behavior commonly associated with daydreaming. A high daydreaminess gene value corresponds to a high tendency of the avatar to daydream in the absence of stimuli, or at least in the absence of priority stimuli.

Figure 19:
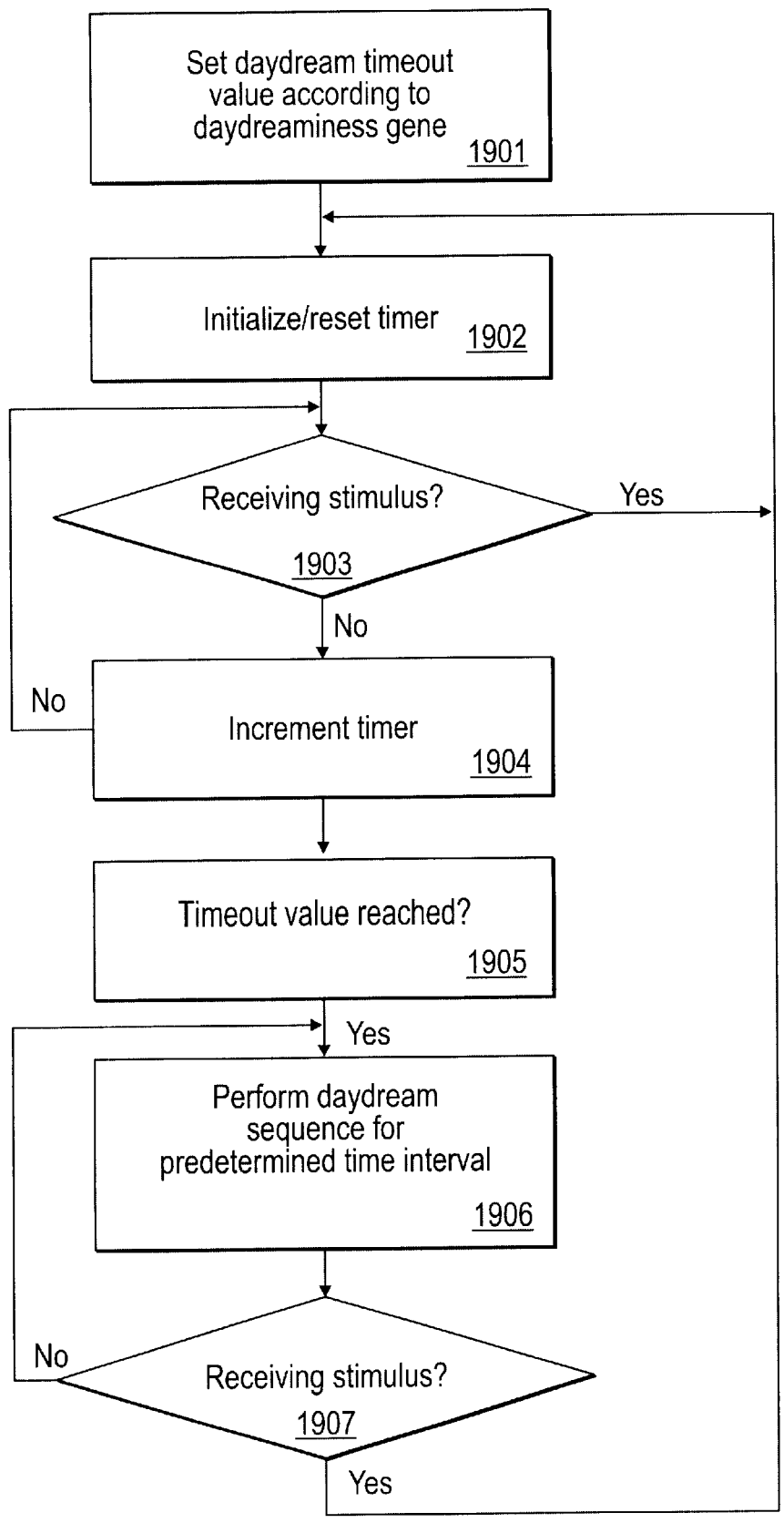
FIG. 19 is a flow diagram of a process for genetically controlling the tendency of an avatar to daydream.

FIG. 19 shows a process for controlling the daydreaminess of an avatar. This process may also be implemented within the sentience engine 122. At 1901, a daydream timeout value is set according to the value of the daydreaminess gene. A timer is then initialized at 1902. At 1903, it is determined whether a stimulus is being received. If the stimulus is being received, the process repeats from 1902 by resetting the timer. If the stimulus is not being received, the timer is incremented at 1904, and then at 1905 it is determined whether the timeout value has been reached. If the timeout value has not been reached, the process repeats from 1903. If the timeout value has been reached (i.e., a predetermined time period has elapsed without a stimulus being detected), then at 1906 a predefined daydream sequence for the avatar is performed for a predetermined duration. The daydream sequence many involve playing one or more daydream animation scripts. Following this predetermined duration, it is determined at 1907 whether a stimulus is being received. If no stimulus is being received, the process repeats from 1906; otherwise, the process repeats from 1902 by resetting the timer.

It will be recognized that other genetically-determined personality attributes, including other sentience characteristics, can be created for an avatar, in addition to those described above.

Thus, a method and apparatus for creating an avatar for a virtual environment are described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of creating an avatar, the method comprising:
   maintaining a set of values in a first processing system, the set of values including a plurality of values that each represent a different anatomical feature of the avatar;
   encoding the set of values in a data structure that does not include any procedural information; and
   transmitting the data structure from the first processing system over a network, the data structure for use by a remote processing system to render and animate the avatar, without transmitting over the network any procedural information for rendering or animating the avatar.

2. A method as recited in claim 1, wherein the set of values does not include geometry data for display purposes, and wherein the data structure is for use by the remote processing to generate geometry data for displaying the avatar on a display device.

3. A method as recited in claim 1, wherein the set of values includes a value that represents functionality of an anatomical part of the avatar.

4. A method as recited in claim 3, wherein the avatar includes a plurality of anatomical parts that are movable relative to each other, and wherein said functionality of an anatomical part of the avatar is an amplitude, phase, or frequency of motion of at least one of said parts.

5. A method as recited in claim 1, wherein the set of values includes a value that represents a behavioral attribute of the avatar.

6. A method as recited in claim 1, wherein the avatar has a face that has a plurality of facial features, each of the plurality of facial features represented by a different one of the plurality of values.

7. A method as recited in claim 1, wherein the avatar has a face that can express a plurality of different facial expressions that can change dynamically during a simulation, and wherein the set of values includes a value that influences at least one of the facial expressions.

8. A method as recited in claim 7, wherein the plurality of facial expressions includes a facial expression that is directly controlled by a user represented by the avatar, and wherein said facial expression is influenced by at least one value of the set values.

9. A method as recited in claim 7, wherein the plurality of facial expressions includes a facial expression controlled automatically by the processing system, and wherein said facial expression is influenced by at least one value of the set values.

10. A method as recited in claim 7, wherein the plurality of facial expressions includes a first facial expression directly controlled by a user represented by the avatar and a second facial expression controlled automatically by the processing system, and wherein the first facial expression and the second facial expression are each influenced by at least one value of the set values.

11. A method as recited in claim 1, further comprising generating a user interface to enable a user to customize attributes of the avatar by adjusting any of the values.

12. A method as recited in claim 11, wherein the user interface provides a separate control for customizing each of a plurality of attributes of the avatar.

13. A method as recited in claim 11, wherein the avatar is modified dynamically during a simulation in response to a user input applied to the user interface during the simulation.

14. A method as recited in claim 1, further comprising:
storing a plurality of models for a particular attribute of the avatar, each of the models representing an extreme case of the attribute;
receiving a user input for setting a value, of said set of values, which represents the attribute;
blending the plurality of models according to said value; and
using a result of the blending to generate the avatar.

15. A method as recited in claim 1, further comprising:
storing a plurality of animations scripts, wherein each of the animation scripts is dependent on one of the values;
receiving a user input setting said one of the values;
blending the plurality of animation scripts according to said one of the values to create a resultant animation script; and
using the resultant animation script to display the avatar in motion.

16. A method as recited in claim 1, further comprising generating the avatar by using a pseudo-random number generator to select at least some of the values in the set of values.

17. A method of creating an avatar, the method comprising:
maintaining a set of values in a first processing system, each of the values corresponding to a different one of a plurality of user-perceivable attributes of the avatar, the set of values including: a plurality of values that each represent a different anatomical feature of the avatar, a value that represents functionality of an anatomical part of the avatar, and a value that represents a behavioral attribute of the avatar;
generating a user interface to enable a user of the first processing system to customize any of the attributes of the avatar by adjusting any of the values, wherein the user interface provides a separate control for customizing each of the attributes;
encoding the set of values in a data structure that includes neither procedural information nor geometry data for display purposes; and
transmitting the data structure from the first processing system over a network, the data structure for use by a remote processing system to render and animate the avatar during a simulation, without transmitting over the network any procedural information or geometry data for displaying or animating the avatar, wherein the avatar can be modified dynamically during the simulation in response to a user input applied to the user interface.

18. A method as recited in claim 17, wherein the avatar includes a plurality of anatomical parts that are movable relative to each other, and wherein said functionality of an anatomical part of the avatar is an amplitude, phase, or frequency of motion of at least one of said parts.

19. A method as recited in claim 17, wherein the avatar has a face that has a plurality of facial features, each of the plurality of facial features represented by a different one of the plurality of values.

20. A method as recited in claim 17, wherein the avatar has a face that can express a plurality of different facial expressions that can change dynamically during a simulation, and wherein the set of values includes a value that influences at least one of the facial expressions.

21. A method as recited in claim 20, wherein the plurality of facial expressions includes a facial expression that is directly controlled by a user represented by the avatar, and wherein said facial expression is influenced by at least one value of the set values.

22. A method as recited in claim 20, wherein the plurality of facial expressions includes a facial expression controlled automatically by the processing system, and wherein said facial expression is influenced by at least one value of the set values.

23. A method as recited in claim 20, wherein the plurality of facial expressions includes a first facial expression directly controlled by a user represented by the avatar and a second facial expression controlled automatically by the processing system, and wherein the first facial expression and the second facial expression are each influenced by at least one value of the set values.

24. A method as recited in claim 17, further comprising:
storing a plurality of models for a particular attribute of the avatar, each of the models representing an extreme case of the attribute;
receiving a user input for setting a value, of said set of values, which represents the attribute;
blending the plurality of models according to said value; and
using a result of the blending to generate the avatar.

25. A method as recited in claim 17, further comprising:
storing a plurality of animations scripts, wherein each of the animation scripts is dependent on one of the values;

receiving a user input setting said one of the values;

blending the plurality of animation scripts according to said one of the values to create a resultant animation script; and using the resultant animation script to display the avatar in motion.

26. A method as recited in claim 17, further comprising generating the avatar by using a pseudo-random number generator to select at least some of the values in the set of values.

* * * * *